US009258296B2

(12) United States Patent
Juthani

(10) Patent No.: US 9,258,296 B2
(45) Date of Patent: Feb. 9, 2016

(54) SYSTEM AND METHOD FOR GENERATING A STRONG MULTI FACTOR PERSONALIZED SERVER KEY FROM A SIMPLE USER PASSWORD

(76) Inventor: Nirmal Juthani, Mumbai (IN)

(*) Notice: Subject to any disclaimer, the term of this patent is extended or adjusted under 35 U.S.C. 154(b) by 190 days.

(21) Appl. No.: 13/811,730

(22) PCT Filed: Jul. 28, 2011

(86) PCT No.: PCT/IN2011/000501
§ 371 (c)(1),
(2), (4) Date: Jan. 23, 2013

(87) PCT Pub. No.: WO2012/014231
PCT Pub. Date: Feb. 2, 2012

(65) Prior Publication Data
US 2013/0124292 A1 May 16, 2013

(30) Foreign Application Priority Data
Jul. 29, 2010 (IN) .......................... 2166/MUM/2010

(51) Int. Cl.
| H04L 29/06 | (2006.01) |
| G06F 21/41 | (2013.01) |
| H04L 9/32 | (2006.01) |
| G06Q 20/40 | (2012.01) |
| G06Q 30/02 | (2012.01) |

(52) U.S. Cl.
CPC .............. *H04L 63/083* (2013.01); *G06F 21/41* (2013.01); *G06Q 20/4012* (2013.01); *G06Q 30/0225* (2013.01); *H04L 9/3228* (2013.01); *H04L 9/3234* (2013.01); *H04L 63/0838* (2013.01); *H04L 63/0846* (2013.01); *H04L 63/0428* (2013.01); *H04L 2209/56* (2013.01); *H04L 2463/061* (2013.01)

(58) Field of Classification Search
None
See application file for complete search history.

(56) References Cited

U.S. PATENT DOCUMENTS

| 5,661,807 | A  | * | 8/1997  | Guski et al. ................... 713/159 |
| 5,790,667 | A  | * | 8/1998  | Omori et al. ..................... 705/78 |
| 6,986,039 | B1 | * | 1/2006  | Leah et al. ...................... 713/155 |
| 2003/0149882 | A1 | * | 8/2003  | Hamid .......................... 713/186 |
| 2004/0098627 | A1 | * | 5/2004  | Larsen .......................... 713/202 |
| 2006/0143456 | A1 |   | 6/2006  | Gentry et al. |
| 2007/0208933 | A1 | * | 9/2007  | Sudo .................... G06Q 10/107 713/153 |
| 2007/0208947 | A1 | * | 9/2007  | Sudo .................. G06F 21/6209 713/183 |
| 2007/0244811 | A1 |   | 10/2007 | Tumminaro |
| 2009/0104888 | A1 |   | 4/2009  | Cox |
| 2009/0288143 | A1 | * | 11/2009 | Stebila et al. ..................... 726/3 |
| 2009/0307069 | A1 |   | 12/2009 | Meyerhofer |

OTHER PUBLICATIONS

International Search Report for International Application PCT/IN 11/000501 Report Dated Jan. 9, 2012.

* cited by examiner

*Primary Examiner* — Samson Lemma
*Assistant Examiner* — Wayne An
(74) *Attorney, Agent, or Firm* — Mark M. Friedman

(57) ABSTRACT

The present invention relates to a method of generating a multi-factor encryption key using a simple password in order to access control over information stored at a second entity from a first entity via at least one communication network. In one embodiment this is accomplished by, requesting to receive an application at the first entity from the second entity via the communication network, activating the first entity to generate a shared secret key, wherein the shared secret key is computed from a first entity specific ID and a random number generated at the first and second entity and allowing the user to register with the application of the second entity by the first entity, wherein the registration include entry of a personal PIN (personal identification number), a personal message etc.

20 Claims, 23 Drawing Sheets

Figure 7

Circular Array of Elements

| Index Position | 0 | 1 | 2 | 3 | 4 | 5 | 6 | 7 | 8 | 9 |
|---|---|---|---|---|---|---|---|---|---|---|
| $CRS_{i+1}$ | A | B | C | D | E | F | G | H | I | J |

Snapshot at Time T1

Snapshot at Time T2

| Index Position | 0 | 1 | 2 | 3 | 4 | 5 | 6 | 7 | 8 | 9 |
|---|---|---|---|---|---|---|---|---|---|---|
| CRS | ◆ | ⚖ | 🐘 | 🐕 | ☺ | 💥 | ✉ | 👥 | ☝ | ☎ |

Part – (C) : Server side identification of actual client from received TCID as part of credit card number

SYSTEM AND METHOD FOR GENERATING A STRONG MULTI FACTOR PERSONALIZED SERVER KEY FROM A SIMPLE USER PASSWORD

FIELD OF THE INVENTION

This disclosure relates to password protection and authentication. More particularly, relates to a method and system for generating of strong secured multi-factor encryption key using a simple password for authentication.

BACKGROUND

Security and privacy of online data and services are of utmost concern to most of the consumers utilizing the Internet. There have been many systems and methods employed to provide security and privacy to the Internet user. Authentications systems are often used to authenticate and verify the identity of a user attempting to access online stored data.

Internet allows a wide variety of services to be availed by the user quickly and cost effectively from virtually anywhere. As the transactions happen on internet there is a need for the user to specify confidential information to third-party websites and applications. In order to simplify and expedite later transactions with the third-party vendor such confidential information is stored with the third-party vendor. Currently the third-party server applications store the user's confidential information such as credit card number etc in their database. One disadvantage of storing user's confidential or sensitive information on the third-party vendor's storage is the possibility that it can be accessed, modified or intercepted by unauthorized party. To avoid this problem, the third-party application vendors are using data encryption, thereby storing the sensitive information after encrypting it. However this is only secure as long as the key to encrypt the data is secured. Also since the same server key is used to encrypt all customers' data on the server, if the key is compromised the confidential data of all customers is lost.

One solution to the above problem could be to have the individual user's data to be protected by a diversified key such as a user password which is chosen by the end-user. The user's confidential data is then encrypted using the password and that password is not stored on the server. However you need a secure way to transmit that password to the server. The use of passwords for protecting the online resources has been in use for quite some time. However the weakness of using password is also well known. For example, a user password can be easily stolen when used, especially when it is transmitted. Another problem is that the passwords are static in nature and easily can be guessed by the attacker. The password constitutes one factor, "What user knows?". To add more security, user should use additional factor to strengthen the identity claim. This is achieved by using hard token or something the user has. Hence the second factor is, "Something user has?". The hard tokens act as a key to access the sensitive online data. However, the user must keep possession of the hard token, which can easily be lost or damaged. For example, a token utilizing physical access to a device and knowledge of a shared secret, such as a PIN, can construct a rotating key that matches a synchronized server key. Such a system is a "two-factor" authentication system because it requires something the user has, i.e., the token, in addition to something the user knows, i.e., the password. Unfortunately, each token in one of these two-factor authentication systems is expensive, subject to loss, and typically restricted to use with one or more network resources of a particular computer network. Moreover, carrying additional gadgets like hard token or grid cards, is not very convenient to users and hence companies have started using the already existing device of the user to consider as this additional factor. This involves installing software on the personal user device of the user, such as a laptop, desktop computer, a mobile device or an iPod. The software installed on the user device, will then generate a One Time Password (OTP) which is then used to authenticate the user. The OTP is valid only for one time use and hence it is an acceptable solution to the weakness of static passwords.

Another problem in the existing authentication system is that the user device (like laptop or a mobile device) can be stolen or it can fall into wrong hands and in that case, even the fraudster can use the software on the user device to generate the OTP. In order to prevent the access to the software a Personal Identification Number (PIN) or a password is often used. This PIN/password is only known to the owner of the device and hence a fraudster will not be able to access the software on the user device. Now for the solution to work, the software on the user device should be able to verify the PIN/password. Since the user device is not secured, it is possible that PIN/password stored on the user device can be discovered by the unauthorized person. To protect the PIN/password, one solution is to use a one-way hash function. It is a well known fact, that it is not possible to reverse engineer the password/PIN from the hash value. However an attacker can copy the software application or hash value from the user device and put it in a personal computer (PC). One can then try different combinations of PIN/password, until the correct PIN/password is entered. To overcome this problem the user device application can be written to limit the number of trials and disabling the software in case of consecutive wrong PINs. However this limitation is easy to overcome by copying the application in PC and restarting it. Hence any solution which stores PIN/password on the client device, even in the encrypted form, is not secured.

Even after solving the static password problem with an OTP, one still faces the issue of encrypting the data on server with a diversified user specific key. As the OTP changes every time, it in itself cannot be used for encrypting the data on server. So one solution would be to use OTP to authenticate user and then use second password to encrypt the sensitive data on server. Again, here also the problem of communicating the second password to server faces the same above issues. Also this is inconvenient as it involves user to remember two Passwords/PINs, one for the client device and another for server side encryption. With so many different online services already requiring user to remember many different passwords, adding more passwords to remember is not a good idea.

In view of the above, there exists a need for an improved and secured multi-factor authentication system that overcomes one or more of the aforementioned disadvantages of current authentication systems.

SUMMARY OF THE INVENTION

An aspect of the present invention is to address at least the above-mentioned problems and/or disadvantages and to provide at least the advantages described below.

Accordingly, an aspect of the present invention is to provide a method of generating a multi-factor encryption key using a simple password in order to access control over information stored at a second entity from a first entity via at least one communication network, the method comprising: requesting to receive an application at the first entity from the second entity via the communication network, activating the first entity to generate a shared secret key, wherein the shared secret key is computed from a first entity specific ID and a random number generated at the first and second entity and allowing the user to register with the application of the second entity by the first entity, wherein the registration include entry of a personal PIN (personal identification number), a personal sign message etc.

In another aspect of the present invention is to provide a safe payment method by generating a dynamic single use password on a client device for performing a payment transaction, the method comprising: activating the client device to generate a shared secret key, wherein the shared secret key is computed from the client specific ID and a random number generated at the client device and server, allowing the user to register with the server by the client device, wherein the registration include entry of a personal PIN (personal identification number), a personal sign message, and a funding source etc and generating a time synchronized single use financial authorization on the client device, wherein the financial authorization is a time dependent single use password to authorize financial transactions, and wherein the financial authorization is dependent on the user PIN.

In another aspect of the present invention is to provide a safe coupon delivery and redemption method using a user device for redeeming a coupon issued by a plurality of merchant, wherein the plurality of coupons is stored at a server, the method comprising: activating a coupon application at the user device in order to perceive a plurality of coupon redemption option message, wherein the coupon redemption option message includes information identifying the merchant and a value of the coupon, generating a Coupon Authorization Number (CAN) with a graphical representation of the same in a bar code, wherein the CAN is a form of time dependent single use password to authorize coupon redemption, scanning to read the bar code or manually enter the CAN generated at the user device by the merchant and validating the CAN by the server triggers the confirmation of the transactions result at the user device and the merchant.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which:

FIG. 7 is an example illustrating the transformation of user's password into server password in accordance with one embodiment of the invention.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. The same reference number or label may refer to signals and connections, and the actual meaning will be clear from its use in the context of the description.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in demonstrative embodiments," "in some embodiment," "in other embodiments," or similar language throughout this specification do not necessarily all refer to the same group of embodiments and the described features, structures, or characteristics may be combined in any suitable manner in one or more embodiments.

Also reference is made to a number of industry standard algorithms and cryptographic schemes in the description of the present invention, it is to be understood that they are used as examples and can be changed without departing from the scope of the present invention. Generation of pseudo random numbers, checksums, check digit and OTP values are well known in the art and specific references made to certain particular algorithms in the following specifications are not meant to be limiting and it will be apparent to one of ordinary skill in the art that similar other embodiments or implementations may be used in their place.

Figure 1:
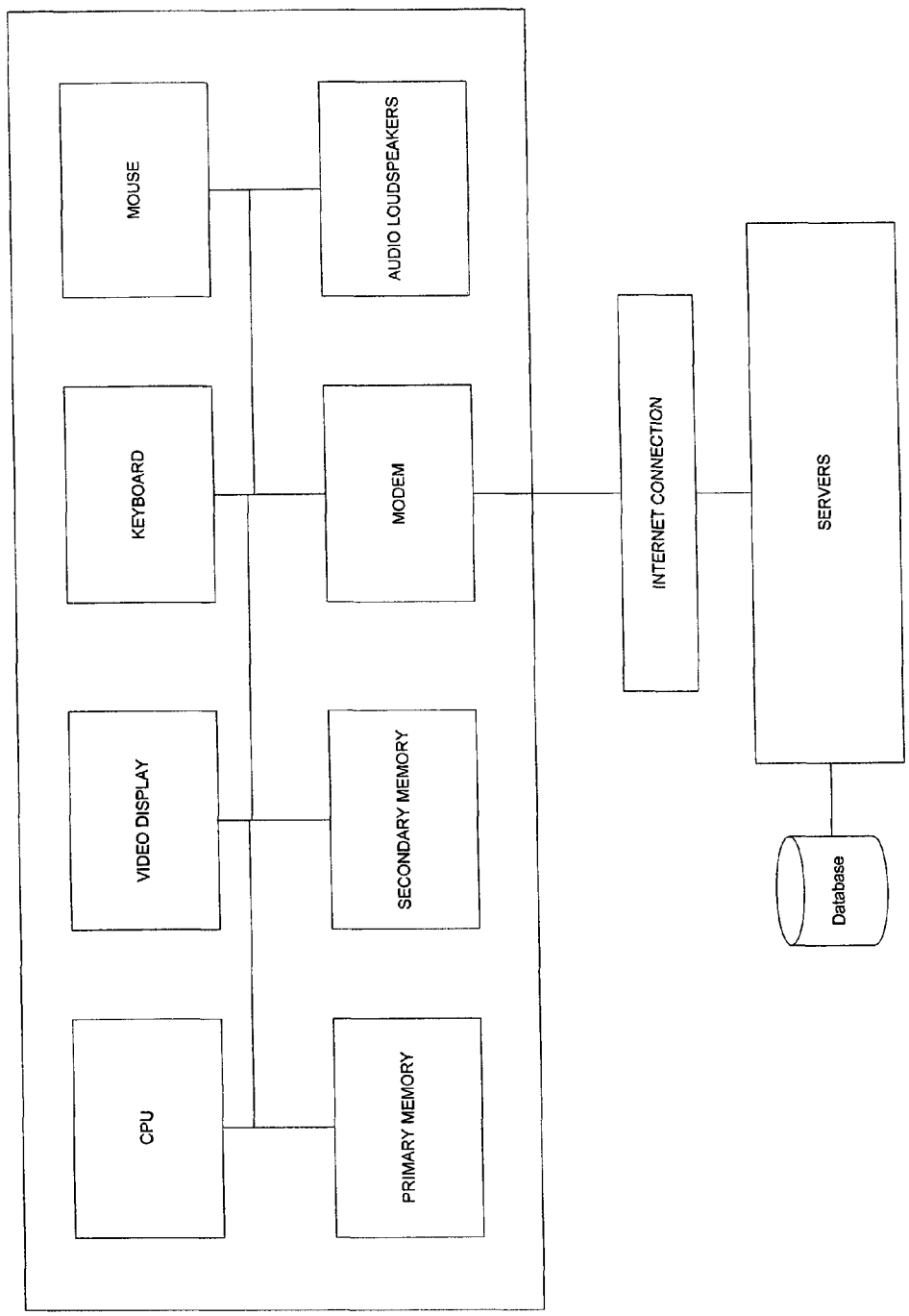
FIG. 1 is a general block diagram illustrating client-server architecture that is suitable for practicing the embodiment of the present invention.

FIG. 1 is a general block diagram illustrating client-server architecture that is suitable for practicing the embodiment of the present invention. Within this environment, client computer is connected with servers via Internet connection. The servers are coupled to a search engine database. The role of the servers will be discussed in more detail below. The client computer includes a central processing unit (CPU) that has access to a primary memory and a secondary memory. The primary memory includes a copy of a web browser (not shown in figure) for purposes of the discussion below, it is assumed that the web browser is the Microsoft Internet Explorer web browser produced by Microsoft Corporation of Redmond, Wash. The primary memory also holds a copy of an operating system (not shown in figure). The primary memory additionally holds a registry (not shown in figure) that holds registered configuration information. The client computer may also include a number of input/output devices, including video display, keyboard, mouse, a modem and audio loudspeakers.

Those skilled in the art will appreciate that the computer environment shown in FIG. 1 is intended to be merely illustrative. The present invention may also be practiced in other computing environments but not limited to mobile devices, cell phone, ipod, ipad and other any PDAs including hardware tokens. For example, the present invention may be practiced in multiple processor environments wherein the client computer includes multiple processors. Moreover, the client computer need not include all of the input/output devices shown in FIG. 1 and may also include additional input/output devices. Those skilled in the art will appreciate that the present invention may also be practiced with intranets and more generally in distributed environments in which a client computer requires resources from a server computer.

Figure 2:
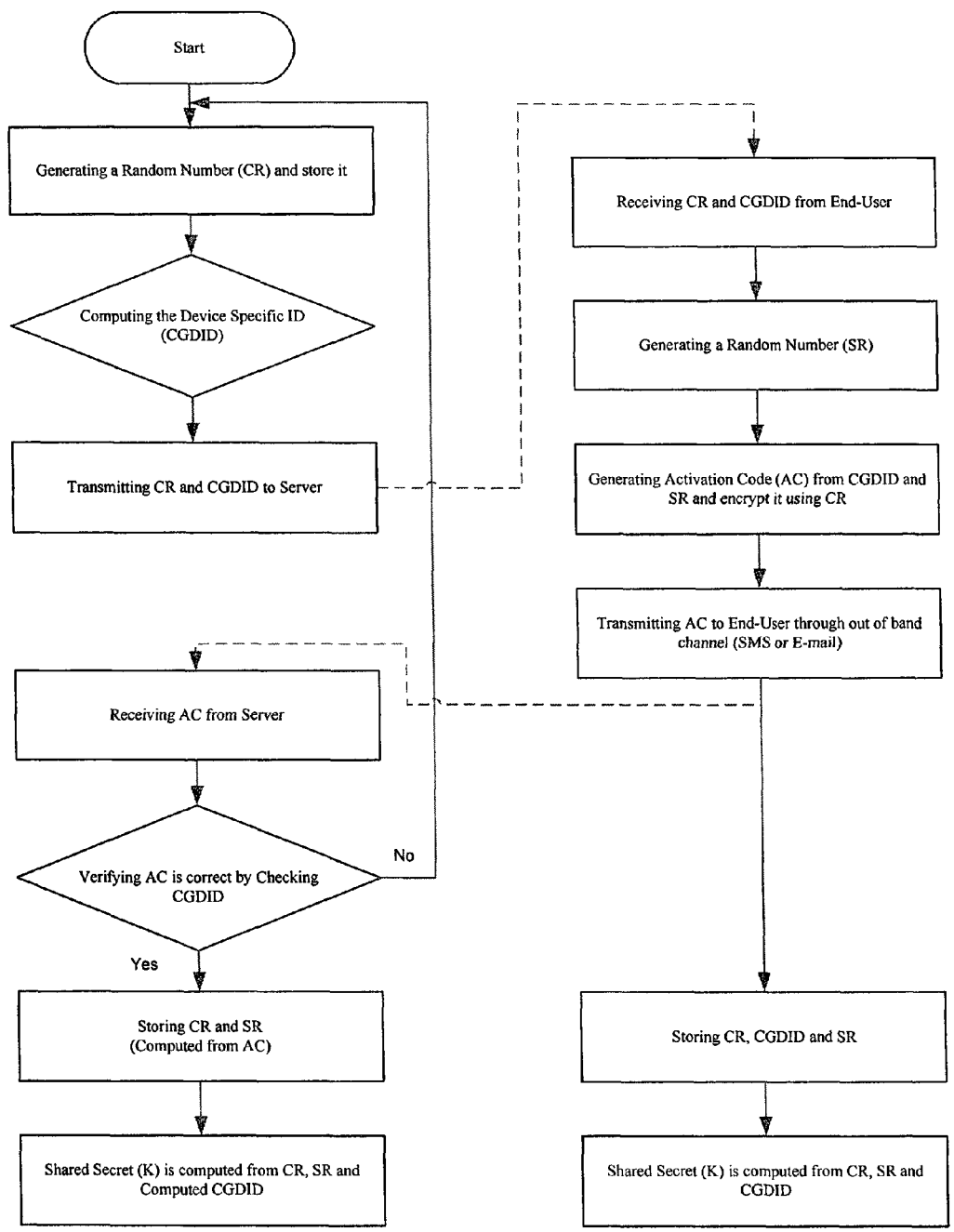
FIG. 2 is a flow chart showing an activation process of the device in accordance with one embodiment of the invention.

FIG. 2 is a flow chart showing an activation process in manual mode of the device in accordance with one embodiment of the invention. The activation process involves generating an initial secret on the end-user device and sharing it with secure storage provider (refer to as server in the following description) to generate a shared secret (K). Secret has two components; a device specific ID (CGDID) and a random number (CR) generated using standard cryptographic random number generator. Device specific ID is unique to each end-user device, where Device Specific ID could be a function of the MSISDN number (MSISDN is a number uniquely identifying a subscription in a GSM) or IMIE number (IMIE is a International Mobile Subscriber Identity) in case of a mobile device. It is always computed on the device itself, and is guaranteed to be the same for every computation on that device. Device specific ID is not stored on the device however the client generated random number (CR) is stored on it. Secret is a reversible computation of a composite data structure from these two data. This secret is in a printable/human readable form and it is passed on to the server. Server can compute components of this secret, namely, device ID (CGDID) and random number (CR).

Server, then, creates a random number (SR) using standard cryptographic random number generator algorithm. This random number is unique and different for each of the activation and is generated for each end-user device. A composite data structure, device activation code is created using this random number (SR) and device ID (CGDID). It is in a printable/human readable form. This device activation code is passed to the end-user using out of band channels such as Email or SMS.

End-user device requires this device activation code to be input by the end-user to proceed further on the activation phase. End-user device can verify that it is a correct activation code by disassembling it and verifying that device ID encoded in it matches its own device ID. The remaining part of the activation code, namely, the random number (SR) generated on the server is used as a component of the shared secret which hereafter is used for further processing. Thus, the final shared secret (K) consists of device ID (GCDID), random number generated on client (CR) and a random number (SR) generated on the server. As all of this information is never passed over the same communication channel in one transaction this shared secret cannot be eavesdropped upon by someone just listening on that one channel. As another alternative of the activation step described above, it is also possible to use any of standard algorithms which allow secure way to generate a shared secret between two parties, such as Diffie-Hellman Key exchange or similar. It may be also be possible where the above activation process can happen automatically where the client device will communicate directly with the server module and without any user intervention The manual mode activation method depicted in the flowchart of FIG. 2 starts the process at the client side after user initiates the activation. First a random number (CR) is generated by the method. Once the random number is generated, the method computes the device specific id (CGDID) after which the random number (CR) and device specific id (CGDID) are combined and passed over communication channel to the server side. On receiving the combined code at block on the server side, a random number (SR) is generated at block. The composite data structure, activation code (AC) is created using this random number (SR) and device specific id (CGDID). This activation code (AC) is passed to the end user from the server side over another communication channel to the client side. The client device receives the activation code after which it is verified by disassembling it and verifying that device ID encoded in it matches its own device ID. If the code doesn't match its own device, the user will have to start the process again. If the device activation code (AC) is correct, the random number (SR) is derived from it, and used for further processing. The client device stores CR and SR which is computed from the device activation code. The client device computes the shared secret K from the CR, SR and the computed CGDID. The CGDID is varied for each and every user device. On the server side CR, SR and CGDID are stored and also shared secret (K) is computed from CR, SR and CGDID.

Figure 3:
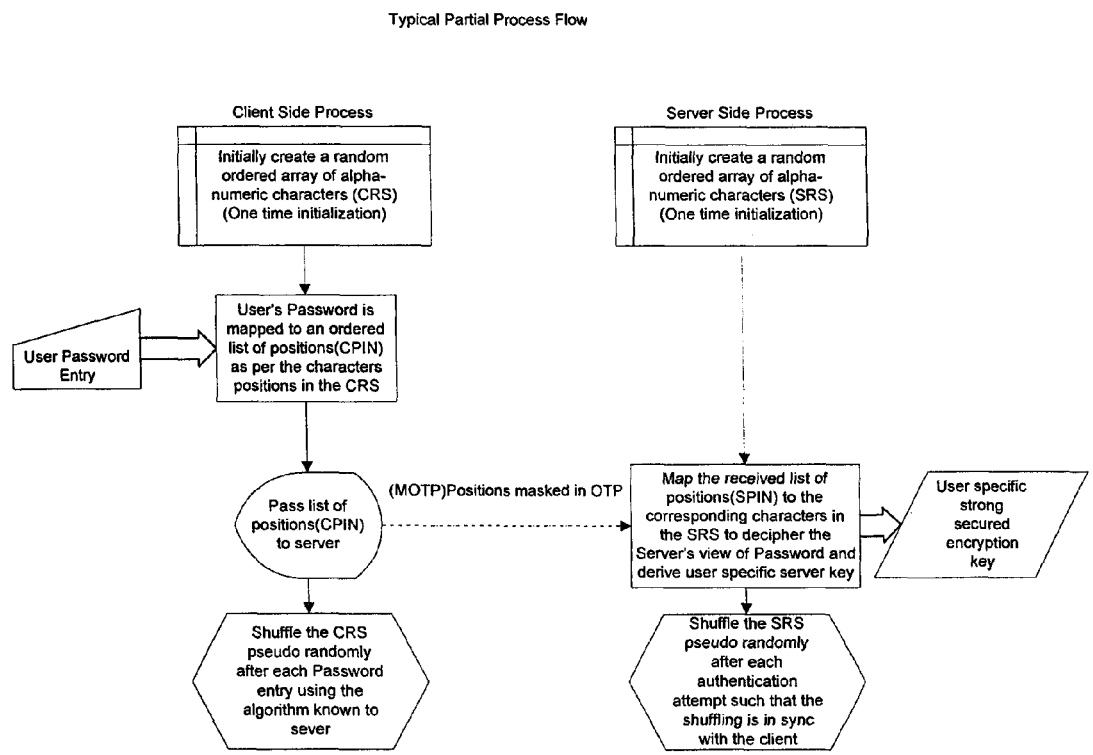
FIG. 3 is a block diagram illustrating generation of the Masked One Time Password (MOTP) at the client side and corresponding decoding of the MOTP at the server side.

FIG. 3 is a block diagram illustrating the generation of Masked One Time Password (MOTP) at the client device and it's decoding to server key on the server side. On the client side, during one time initialization the method starts by generating a random ordered character array (CRS) using a cryptographic random string generator and stores it. This random ordered character array will not contain any character more than once; also it can be arbitrarily long. In general, longer the character string array, harder it is to guess the data encrypted using it. It is to be noted that the CRS need not be limited only to characters; it can be an ordered collection of any items such as icons, symbols, colors, graphic images or audio phrases. The user password is an ordered collection of a subset of these items. For the sake of brevity, we refer to CRS as a collection characters for the following example. Also as part of the initialization, two counters TC-client and C-client are also initialized. The TC-client is a moving counter based on the time-step value and C-client is an event based counter, which is incremented after the generation of each OTP. Numerous algorithms are known for generating OTPs, including the HOTP algorithm, which is specified in RFC 4226 and hence anyone of them could be used to achieve the same result.

On the client side, the method starts after the user enters the password. The characters in the user's password are mapped to their respective positions in the CRS to obtain the CPIN. The CPIN is then padded if required (if user's password is less than the max length) and optionally a check Digit is added based on the Verhoef's algorithm to get the VPIN. Using shared secret (K) as a seed and counter (TC-client, C-client), industry-standard OATH algorithm (HOTP algorithm as described in RFC 4226) is used to compute One Time Password (OTP). The VPIN is then encrypted with OTP to generate the MOTP (Masked OTP). The encryption process used here is a reversible encryption and one which generates the same number of digits/characters as the VPIN. For example we can use a bit wise XOR or a digit by digit mathematical operation. If the MOTP is in base 10 numeric digits form, then we can use modulo 10 arithmetic function on the VPIN and OTP. So with a VPIN=3201 and OTP=4671, with modulo 10 addition we get MOTP=7872. On the server side the decryption process involves generating the same OTP and doing the opposite, namely modulo 10 subtraction. Hence we get MOTP=7872, OTP=4671 and after decryption we get VPIN=3201. Any suitable reversible encryption/decryption process with OTP as the key/mask can be used for this purpose.

Next, a shuffling function (SF) is used to shuffle the CRS and the shuffled CRS is stored for next iteration. The counter C-client is also incremented and stored. The SF uses Cryptographically Secured Pseudo Random Number Generator (CSPRNG) for producing the Transformation matrix (TM) of displacements. In the preferred embodiment the CSPRNG can be based on Advanced Encryption Standard (AES) block cipher used in the Output Feedback mode (OFB) with full feedback. And Knuth shuffle algorithm can be used as shuffling function (SF) using the random numbers generated from the CSPRNG to produce the shuffle displacements as the TM. Using shared secret as the key this SF function generates new TM (Transformation Matrix) for each of the iterations and shuffles the characters in current CRS.

On the server side, during one time initialization the method starts by generating a random ordered character array (SRS) using a cryptographic random string generator and stores it for the associated user record. There will be a unique and different SRS for each registered user. Please note that this random ordered character array is different than the client side generated array (CRS) and it has no relation to it other than that both the arrays are of the same length for each user. This random ordered character array will not contain any character more than once; also it can be arbitrarily long. In general, longer the character string array, harder it is to guess the data encrypted using it. Also as part of initialization, it generates an initial value of the counter (TC-server) either based on pre-agreed value with the client based on shared secret (K) or on the basis of the received MOTP time. This decision is based on whether time based OATH algorithm is used or just event based OATH algorithm is used. It also initializes the counter (C-server).

On receiving the MOTP from the client, the server side method computes OTP by using shared secret (K) and moving counters (TC-server calculated based on the received time of MOTP and C-server) as input to the OATH algorithm. After computing the OTP, it de-masks the MOTP by doing the opposite of the reversible encryption process followed on the client side. It can be either modulo 10 subtraction of the OTP from MOTP or XORing OTP with the MOTP to obtain the VPIN. Optionally it then verifies the check-digit/checksum to make sure it is a valid VPIN. If it is a valid VPIN, then check-digit and padding is removed to obtain the SPIN (the CPIN positions which were encoded in the MOTP). The server can then compute the SP, the server's view of the user's password by mapping positions in the SPIN to characters in the corresponding SRS. The resulting server side password (SP) can be used to generate a Strong Server side user specific encryption key (USKEY) using the Password Based Key Derivation Function (PBKDF) as defined in the PKCS#5 v2.1 or later. Using this key the sensitive user data on the server can be encrypted without storing the server password (SP) or the encryption key (USKEY).

Optionally the server may store a zero-knowledge proof of the server password on the server for later verification. One of the ways, this can be done is using the Secure Remote Password protocol as specified in RFC 2945. This SRP protocol stores the verifier and salt on the server without storing the actual password or its hash-value. The verifier and salt can be later used to verify the authenticity of the actual password which was originally used to generate the verifier and salt. In this scheme, first time during user's registration of the password, the user supplies two MOTP values which are generated using the same PIN/password on client device and server after generating the server password for the both the MOTP values, compares the two values of the server passwords. If they are same, that means the user must have entered the same PIN/password for the both the MOTP generation. In that case a random salt is chosen and a verifier is calculated. The server stores these verifier and salt, rather than the actual server password.

Next, a shuffling function (SF) is used to shuffle the SRS and the shuffled SRS is stored for next iteration. The counter C-server is also incremented and stored. This SF is using the same algorithm as the client side SF and also uses the shared secret K, such that shuffling of the SRS is in sync with the shuffling of the CRS on the client side. Using shared secret as the key this SF function generates new TM (Transformation matrix) for each iterations and shuffles the characters in current SRS.

It is possible that server and the client application may not both have calculated the same value of TC or C, as it may go out of sync. This is possible, if user has tried multiple MOTP generation before using those at the server in which case the value of C-server will be different then the C-client. Also the time-step-window (difference in time-step counter values TC-server and TC-client) for the OTP generation at the client and server may be different due to OTP transmissions delay. Hence server may try few different values for the permutations of TC-server and C-server, by using different TC-server and C-server values. The TC-server is based on time step window and server may try at most 'n' time step values to allow for the network delay. Also server may try at most 'm' different values for C-server in increasing order. This look-ahead window should be kept to the minimum. This look-ahead window provides for at most 'n'בm' different permutations and hence those many attempts of guessing the right OTP. A larger look-ahead window would introduce some OTP attack window; hence it is RECOMMENED to keep it at minimum while still maintaining the system usability. Once a valid permutation for TC-server and C-server is determined, the server can calculate the value of C-client used at the client side and accordingly adjust its shuffling of the SRS.

Figure 4:
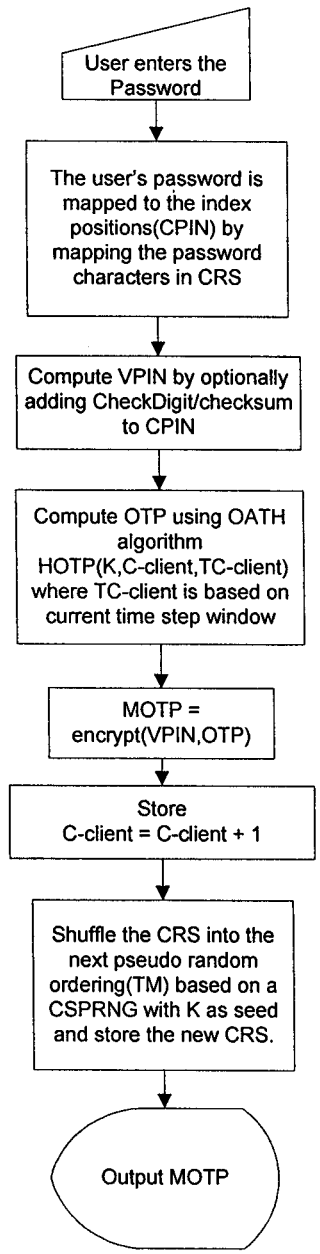
FIG. 4 is a flow chart showing generation of Masked One Time Password Generation (MOTP) at the client device or user device.

FIG. 4 is a flow chart showing the generation of Masked One Time Password (MOTP) at the client device. First, end-user is prompted to enter a PIN/Password (Personal Identification Number) into end-user device using one of the password input method. The user's password is then converted into CPIN (an ordered list of positions of the user's password characters in the current CRS). Since the CRS is shuffled after every MOTP generation, every time the user's password is mapped to CPIN, the value of CPIN will be different. Hence every time the user's password is mapped to different CPIN. This is further illustrated with an example in the FIG. 7. The CPIN is then padded (if user's password is less than the max length) and optionally a check-digit/Checksum is added to get the VPIN (Verifiable CPIN positions). The checksum/check-digit is added to CPIN, such that on the server side it can be used to verify the validity of the CPIN. Based on the available digits/characters for the MOTP length, the check-digit or checksum is added. For example, in case of an 8 digit numeric only MOTP, the check-digit can be a single digit, based on the Verhoef's algorithm. The VPIN is then encrypted using a reversible encryption process using OTP as the key to generate the MOTP (Masked OTP). The OTP is generated using an HOTP algorithm using the shared secret K, a time based counter value TC-client and an event based counter value C-client. The MOTP is presented to the end-user in a human readable form and is communicated to the server. The counter (C-client) is then incremented and stored. Also the CRS is shuffled using the next transformation matrix obtained from the SF and stored. Since the previous transformation matrixes are not stored and it is not possible to generate the previous transformation matrixes from the current CRS, it makes sure, someone getting access to the current MOTP and the device will not be able to map the MOTP back to the user's password.

Figure 5:
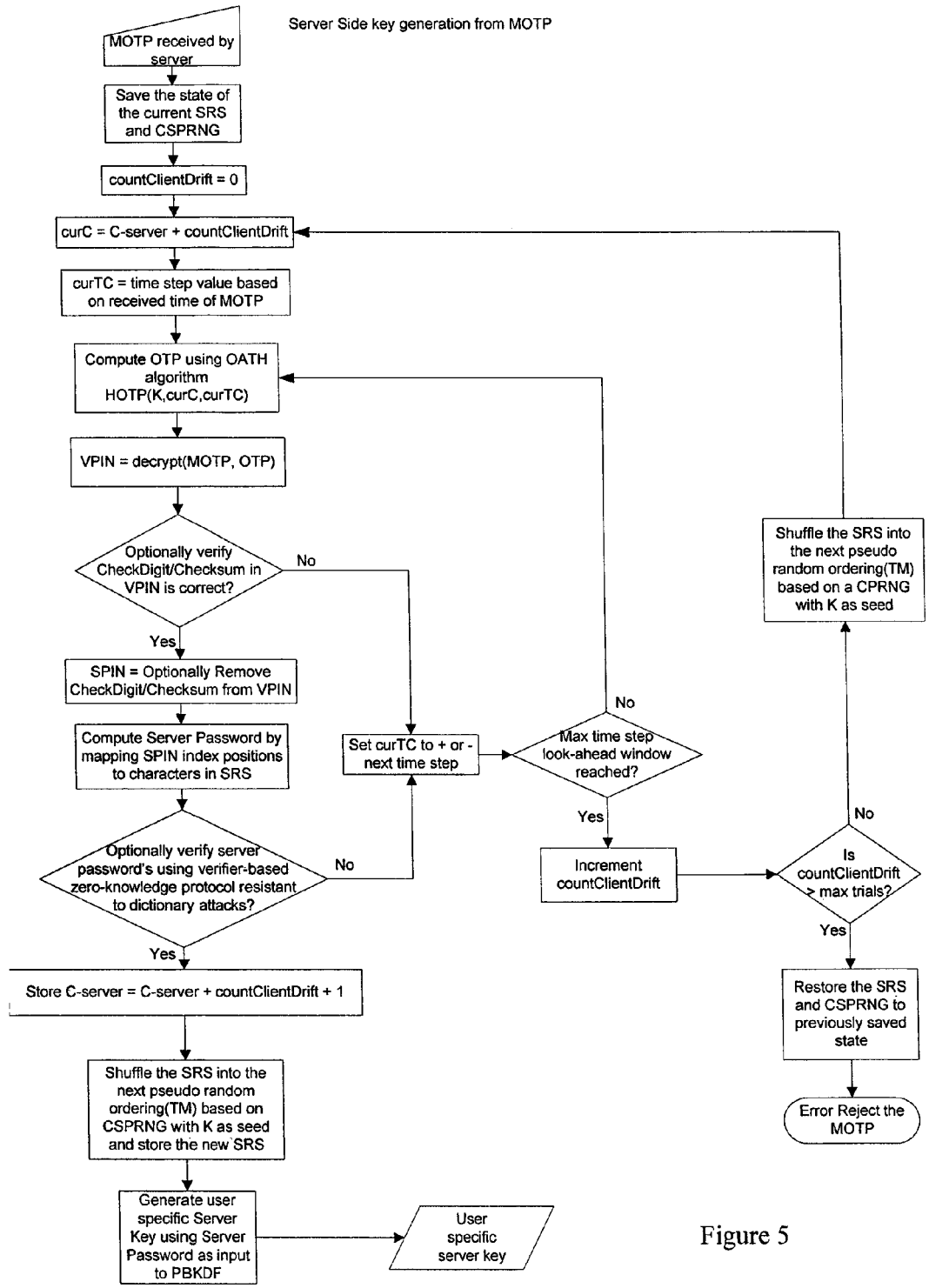
FIG. 5 is a flow chart showing the generation of user specific multi-factor dependent server key at the server using the MOTP generated by a user password in a user device in accordance with one embodiment of the invention.

FIG. 5 is a flow chart showing the generation of user specific multi-factor dependent server key at the server side using the MOTP generated by a user password in a user device in accordance with one embodiment of the invention. The method starts with receiving an MOTP (generated by the end-user on the client device). A variable 'countClientDrift' is initialized to try different possible values of the event based counter to be used in HOTP algorithm. Then a value for the variable curC (event based counter value to be used in the HOTP algorithm to generate the OTP) is calculated based on the value of C-server and countClientDrift. The server also calculates the value of time step counter based on the received time of the MOTP and initializes the variable curTC with it. Now a value of the OTP is calculated using the current values of curC and curTC. Using this value of OTP, VPIN is obtained from the MOTP by decryption process using the OTP as the key. Then optionally the validity of the VPIN is checked by checking the checksum or check-digit embedded in it.

If the server's value of OTP is same as the value used by client for generating the MOTP, then we will get the same VPIN that was encrypted or masked by the client and hence the check digit or checksum in the VPIN obtained in the above step will be correct. If VPIN is found to be valid, then SPIN is obtained from VPIN after removing the check-digit or checksum from it. The SPIN is same as the CPIN (the ordered list of the user's password character positions in client CRS) which was embedded in the MOTP. The server then takes the position values in the SPIN and maps them to the corresponding characters in the current server side SRS to obtain the server password. If a verifier and salt for the server password as specified in Secure remote password protocol (RFC 2945) were stored from previous password registration step, then the server verifies the current server password according to that protocol. If it finds the server password to be invalid or if the VPIN was found to be invalid, than a number of different values of curTC are tried to calculate new OTP values and the above steps are repeated. This is done so as to allow for network delay or user entry delay or difference in time between the client and server. This is done within a maximum time-step-window period.

After trying all allowable time values, if no valid VPIN or password checksum is found, then value of the curC (event based counter) is incremented using the variable countClientDrift and different values of OTP are obtained and verified again. If after trying max number of allowable attempts with different values of the event based counter and time based counter, a valid password is not obtained, then last saved state of the SRS and CSPRNG is restored and current MOTP value is rejected. If a valid VPIN and password checksum is found, then server code continues to carry out the further steps for obtaining the user specific server key.

After finding a valid server password, the value of C-server is incremented by the value of (countClientDrift+1). The value of countClientDrift adjusts the server counter C-server to the same value as that of the client. The SRS is finally shuffled one more time and stored for the next iteration to be in sync with the client side CRS. Thus generated server password can be used to generate a strong user specific server side key using Password Based Key Derivation Function (PBKDF) as defined in the PKCS#5 v2.1 or similar schemes. Please note that the server password or the user specific server key derived from it is not stored on the server and they are only used to encrypt or decrypt the sensitive data on receipt of the valid MOTP.

Figure 6:
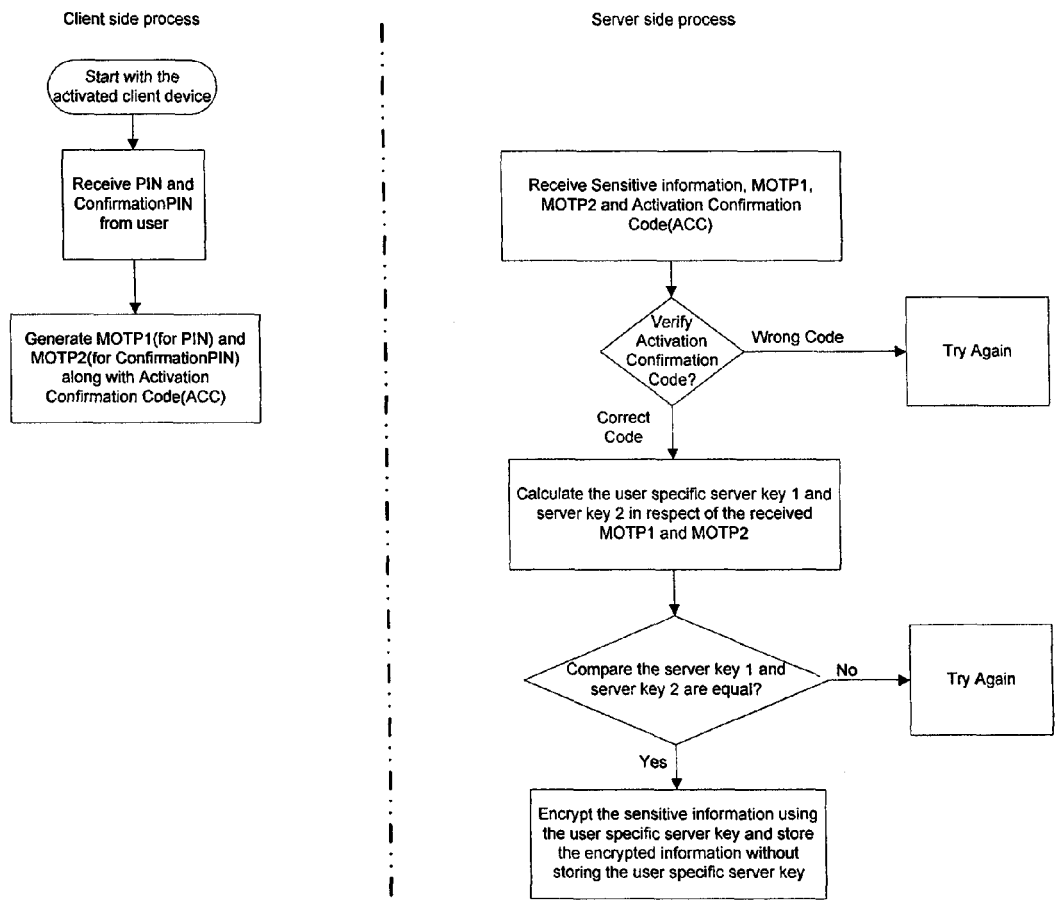
FIG. 6 is an example of user's password/PIN association with sensitive data storage at the Server side in accordance with one embodiment of the invention.

FIG. 6 is a block diagram showing registration of PIN or Password with sensitive information storage in accordance with one embodiment of the invention. The diagram shows the process on the client side as well as the required process on the server side. On the client side the method starts with receiving a PIN and a confirmation PIN from the end-user on the activated user device. Once the PIN is received by the user device, it generates Masked One Time Password (MOTP) based on the PIN entered by the User i.e. MOTP1 for the PIN and MOTP2 for the confirmation PIN. The generation of MOTP from user PIN/password is explained before and is not discussed here. The user device also generates the Activation Confirmation Code (ACC) which is a number generated such that the server can verify that the client is activated and knows the shared secret K. The end-user uses the generated Activation Confirmation Code (ACC), MOTP1 and MOTP2 to register and encrypt the sensitive information on the server. On server side, the server receives the ACC, MOTP1, MOTP2 and sensitive information. The method verifies the activation confirmation code. Once the activation confirmation code is verified, the server verifies that the user device is activated and knows the shared secret K.

Once the user device is verified, the server calculates the server Key 1 and server key 2, which are generated in respect of the MOTP1 and MOTP2 entered by the user. The method compares the server Key 1 and server Key 2 for equality. If the both the server Keys from both MOTPs matches, then PIN and confirmation PIN entered by the end user must be the same for the two recorded attempts, otherwise the end user is asked to re-generate the MOTPs on the user device again by entering the PIN correctly. If the correct PIN was entered by the user then, the resulting server side key can be used to encrypt the sensitive information on the server. The encrypted cipher text is then stored on the server without storing the user specific server key. Thus the strong server side encryption key generated using the password entered by the user on user device is used to encrypt the sensitive information on server. Optionally the server can store some information to validate the server password on server side, however it is required that the information stored should not leak any more information about the server password to any adversary and should be resistant to the brute-force key search and dictionary attacks. One way to achieve this is to use the Secure Remote Password protocol as defined RFC 2945 and store the verifier and salt on the server for later verification of the server password.

After activation and registration phases are successfully completed, the end-user can use the end-user device to securely store/retrieve the sensitive information on the server. For every secure transaction, end-user is required to provide PIN/Password. Based on this a new MOTP is generated at the client and used on the server side to obtain the Server's view of the user's password which is then used to get the user specific strong server key (USKEY). The USKEY is then used on the server side for decrypting the cipher text to obtain the previously stored sensitive information. The storage provider thus can be utilized to store private key (PKI), X.509 Digital certificates or other sensitive private information owned by the end-user securely using the USKEY.

Figure 7:
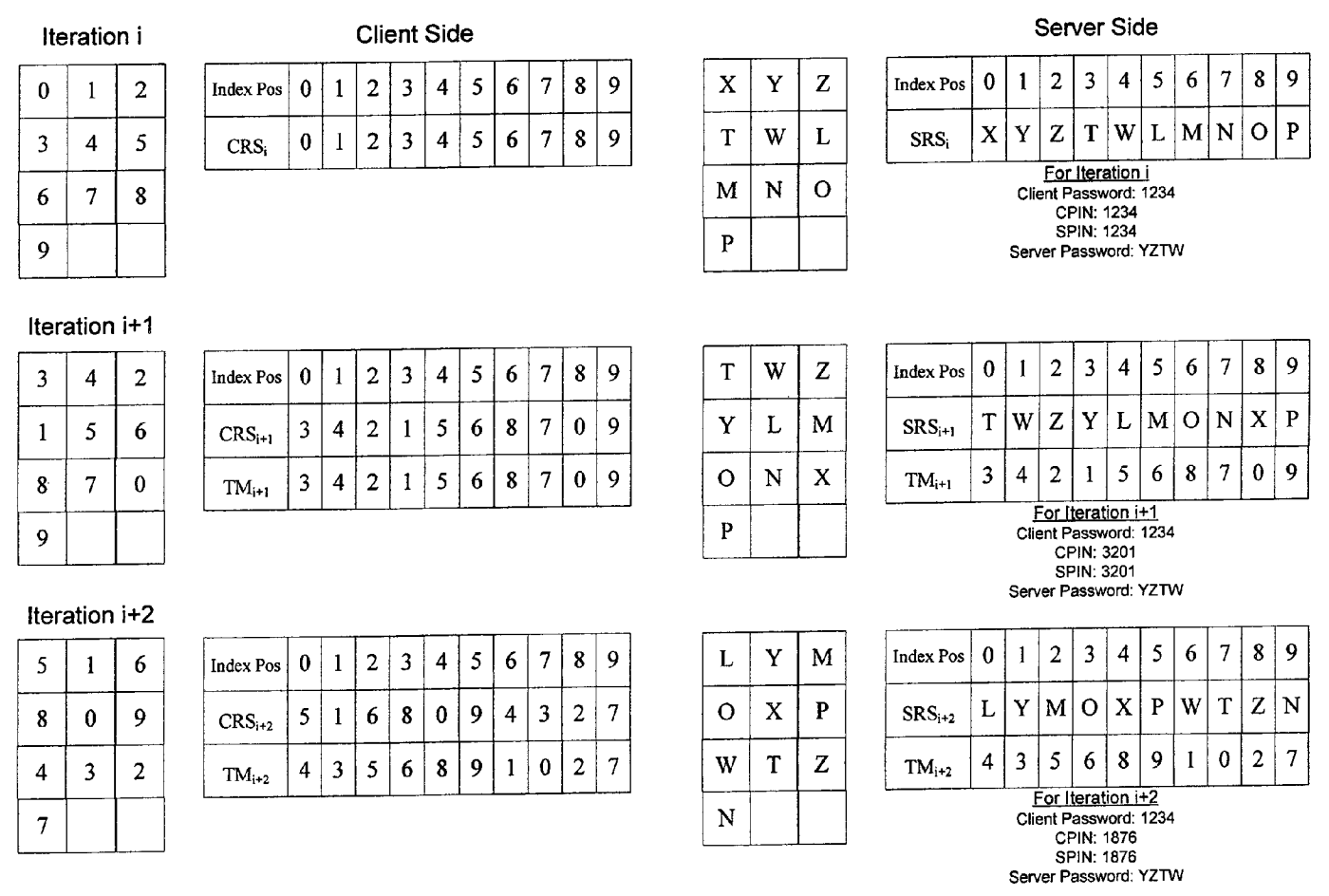

FIG. 7 is an example illustrating the transformation of user's password into server password for different iteration between client and server in accordance with one embodiment of the invention. For this simplified example, we assume that the client side CRS is consisting of numeric digits 0 to 9 and they are in index positions 0 to 9 respectively in the CRS. The server side SRS consists of characters X, Y, Z, T, W, L, M, N, O, P in the index positions 0 to 9 respectively. For this arrangement (let's say iteration i), if the user enters a password, for example 1234 at the client side, the password generated at the server side is YZTW. At the next iteration i.e. i+1, the CRS at the client side would have been shuffled according to the transformation matrix $TM_{i+1}$ and the characters would have had the index positions as shown in the figure. As the client and server shuffling are synchronized, the SRS at the server side would have also been shuffled according to the same transformation matrix $TM_{i+1}$ and the server side character mappings will be as shown in the figure. Again if the user enters the same password i.e. 1234, the client generated ordered position array (CPIN) will be 3201 (as shown in figure). When this CPIN is masked in OTP and passed to server as MOTP, the server will be able to decrypt MOTP to get the SPIN as 3201. Now when this SPIN is mapped to characters in the current $SRS_{i+1}$ it will yield the same server password YZTW. Since the server side random ordered array is also shuffled on the same fashion as at the client side, the password retrieved at the server side is same as of the previous iteration. Again for the next iteration i+2, the CPIN for the same user password will be 1876, however it will also yield the correct server password YZTW when decoded on the server side.

Figure 8:
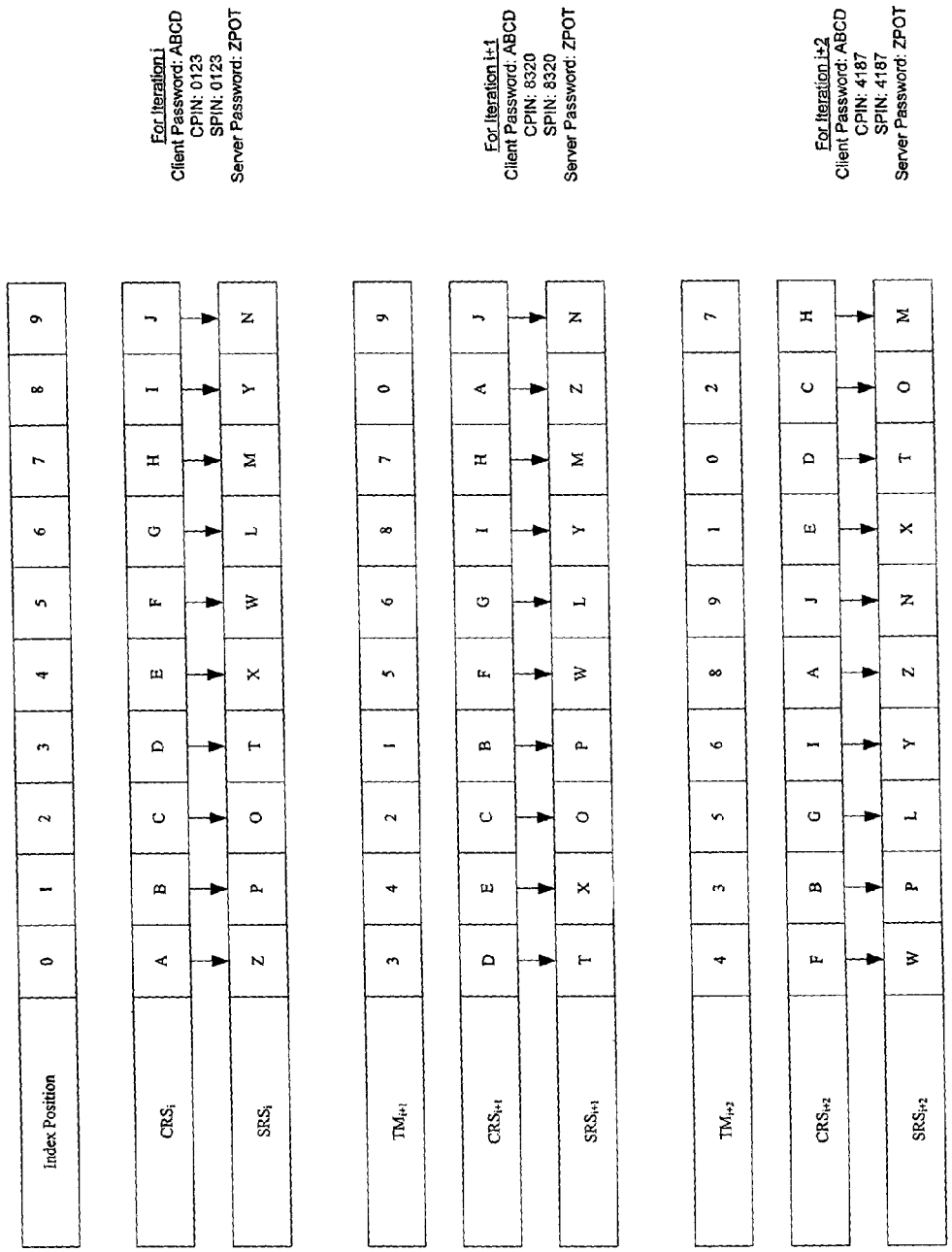
FIG. 8 is an example showing client and server side key mapping transformations with client array CRS consisting of letters in accordance with one embodiment of the invention.

FIG. 8 is an example showing client and server side key mapping transformations with client side CRS consisting of letters A to J in accordance with one embodiment of the invention.

Figure 9:
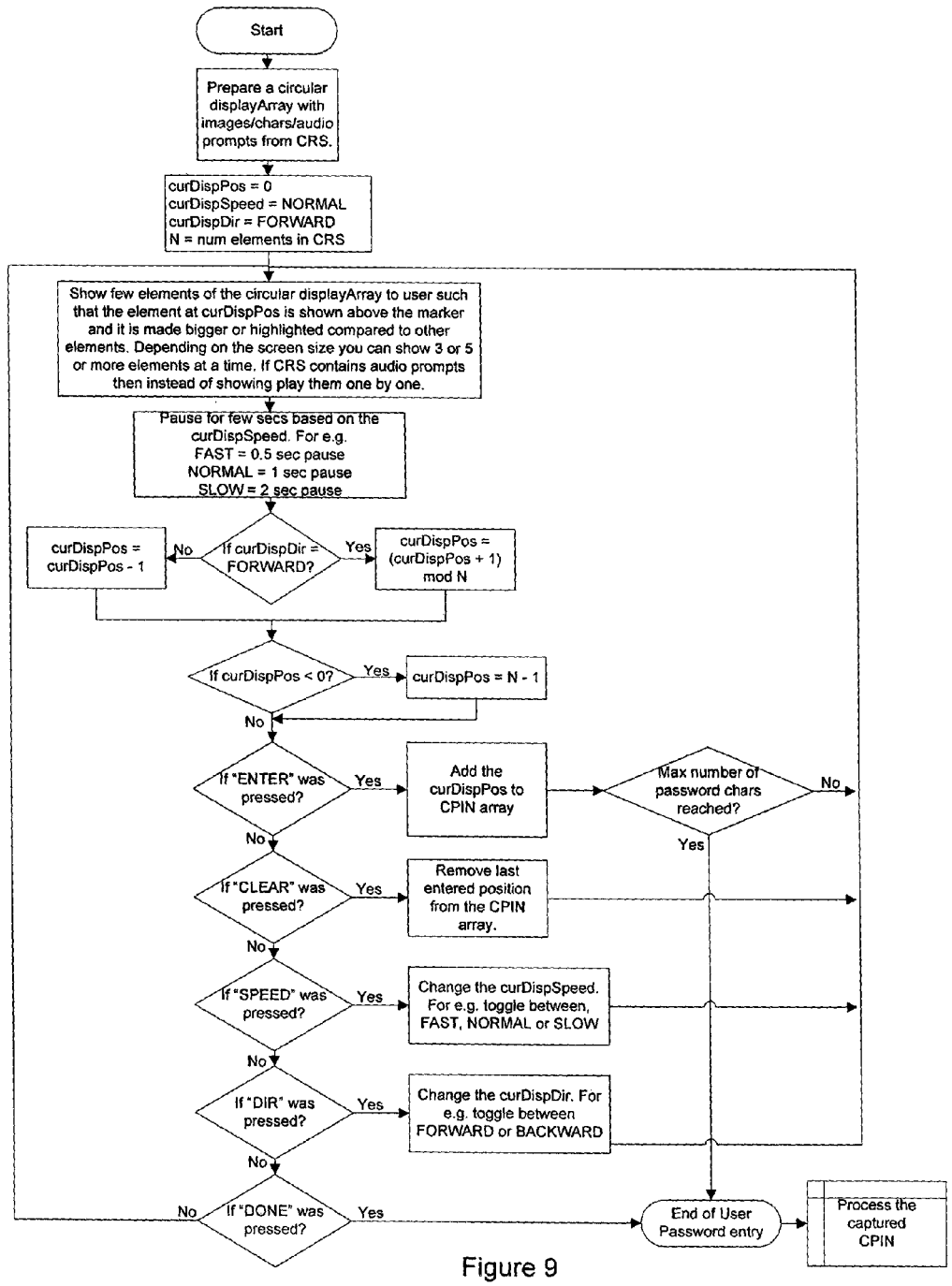
FIG. 9 is a flow chart for a password input method at the client side in accordance with one embodiment of the invention.
Figure 10:
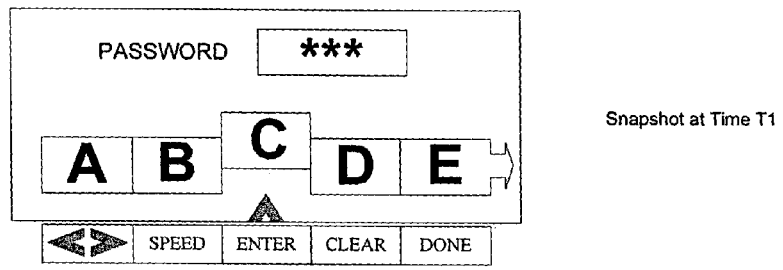
FIG. 10 shows different examples of a virtual keyboard in a rotary format layout including characters and graphics for password entry.
Figure 10:
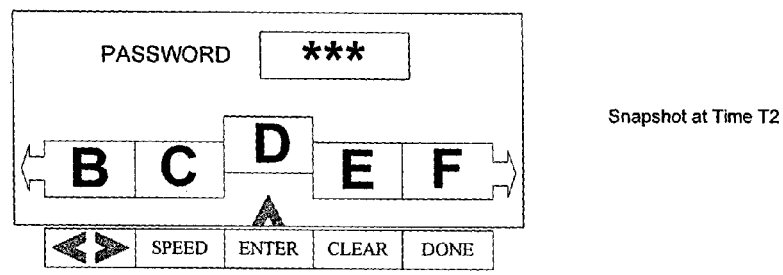
Figure 10:
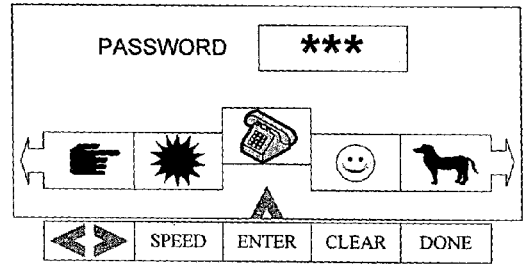

FIG. 9 is a flow chart for a password input method at the client side in accordance with one embodiment of the invention. The password may consist of graphic images, symbols, colours or audio prompts. Also the input method protects the user password from stealing by key loggers as the real password is not revealed in the key strokes. Here it is assumed that the CRS is pre-populated with the items which the user can use to construct the password. This can be done by user pre-selection or system can randomly select some items from a larger set. The method starts by preparing a circular array of items from the CRS. Then it displays few of the items from the circular array and arranges them such that one of the items from that is the current item which is placed under a visual marker. The items in the display are rotated in one direction at a certain variable speed. There are options for end-user to change the rotation direction and speed. Also user can press a button "ENTER" to select the current item and its position in the CRS is entered into the CPIN array. The user can also clear the last selected item, by pressing the "CLEAR" button. The current number of items in the CPIN array is shown to the user in a display box with "*" for each item as shown in FIG. 10. When end-user is done with entering the password, the user can press "DONE" and the method stops and provides the current CPIN array for further processing. The CPIN array is then processed as usual to produce the MOTP as described earlier.

FIG. 10 shows different examples of a virtual keyboard in a rotary format layout including characters and graphics for password entry.

In accordance with another embodiment of the present invention, client and server synchronized key mapping transformations can be used to generate a dynamic time based client/user identification number. This along with MOTP can then be used to generate a dynamic one time use credit card number in accordance with one embodiment of the present invention.

Figure 11:
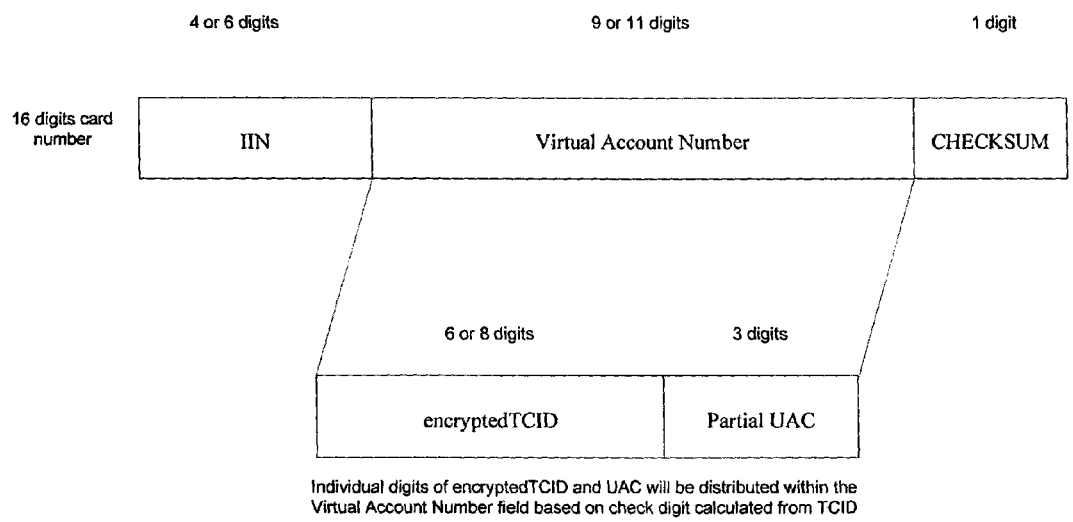
FIG. 11 shows a 16-digit credit card numbering scheme in accordance with one embodiment of the invention.

FIG. 11 shows a 16-digit credit card numbering scheme in accordance with one embodiment of the invention. In addition to the 16-digit credit card number, the scheme will have the expiration date for the credit card generated in the following manner. The format of the expiration date will be: MM-YY, Where MM will be used to capture the $4^{th}$ digit of the User Authentication Code (UAC) such that month value of 1 to 9 will represent the digit values 1 to 9 and 10 will be used to represent the digit value of 0. The month values of 11 and 12 will be reserved and will not be used. Year value YY, will be used to capture the current time-slot on which the card number is generated. The value of YY is set such that modulo 3 of the time-slot based counter value is taken and based on the return value; the YY is adjusted as follows:

If the return value is 0, then YY is set to current year+1
If the return value is 1, then YY is set to current year+2
If the return value is 2, then YY is set to current year+3

As shown in the FIG. 11, the IIN is a 4 or 6 digit Issuer Identification Number and is used to identify the organization or Bank which issued this card number. This is fixed and passed to the client by the server when the end-user registers for the dynamic credit card. It is recommended that the issuer should use a special purpose IIN to identify the virtual dynamic card number range so that it does not get confused with the other permanent card numbers generated by the same issuer. Next the virtual account number field consists of encrypted TCID and Partial UAC values. The individual digits of the encrypted TCID value and UAC are distributed in the virtual account number field based on the value of the check digit calculated for the TCID value. The TCID value corresponds to a dynamic time based customer identification number. This number is used to identify the unique customer from the dynamic credit card number. This field TCID, is based on time and varies with every timeslot. The UAC field is the User authentication code and it is dependent on the user's password or PIN. The value of UAC varies for every transaction. The last digit in the credit card number is the check-digit calculated according the Luhn's algorithm and is used to validate the credit card number. Further the system can optionally also generate a 3 digit CVV code. This could be used to accommodate the remaining digits of a larger UAC value or could be based on some other information based on which the authenticity of the client can be strengthened.

When the user registers for the dynamic credit card service, the server assigns an tcidEncryptionKey, UID and a uidKey-Map layout (SCRS) to the client. The tcidEncryptionKey is used to encrypt the TCID value before embedding it in the virtual account number field. Please note that the uidKeyMap layout (SCRS) is a different character array then the client side generated key map layout (CRS) which was specified earlier. The SCRS layout is generated at the server side and assigned to each registered client. Also the character array SCRS, will not contain any character more than once. Further an IIN is assigned to the client device by the server which is based on the payment information registered by the user and is used to route the dynamic credit card request through the credit card network to the correct issuer where the dynamic credit card system's server side module is installed. Also a common seed key (CSK) is passed to the registered client, so that it can generate random numbers in synchronization with the server. This key and current timeslot value is used to produce transformation matrix for shuffling of the SCRS when generating the dynamic credit card number. The CSK is common and shared for all registered clients, hence all registered clients and server can synchronize their transformations with respect to time. After registration, when user requests a new dynamic credit card generation, the client device uses the SCRS shuffled according to the transformation matrix for the current timeslot to generate the TCID which is used in the virtual account number part of the card number. The UAC part of the virtual account number is generated by generating a 4 digit MOTP using the password/PIN supplied by end-user as explained earlier. The UAC is 4 digits, with 3 digits stored as part of the virtual account number and $4^{th}$ digit embedded as month part of the expiration date. The year part of the expiration date for the currently generated dynamic card number is then calculated using the modulo 3 of the current timeslot counter value as explained before. The timeslot counter value is calculated based on time step values from the start of UNIX epoch time for the current timeslot.

The server module of the dynamic credit card system is installed on the issuer network at the issuing bank or institution which is identified by the IIN. So when the dynamic credit card number comes for authorization through the credit card interchange network, the server module can determine the actual client from the credit card number and expiration date and perform the actual authorization on the payment instrument registered by the end-user with the existing system. How the client is determined from the virtual account number part of the credit card number is explained later in the specification given below. Now, when the client generates a dynamic card number, the timeslot used by it may not be the same as the timeslot value calculated from the transaction time when the server receives the transaction based on that dynamic card number. This may be due to the network delay or difference in time between the server and client. To account for this, the server checks the TCID value against 3 timeslot values: namely the current timeslot and one before and after the current timeslot. Based on the value of the expiration date of the received credit card transaction the server determines which of the 3 possible timeslot values to use. This will become clearer with an example. For e.g. if the value of YY is equal to the value of current year+1 then we know that the result of the modulo 3 of the counter value on the client side would have been 0. Now if the current counter value on the server is 255 then, we know that the client and server are in sync and we assume the current server timeslot value for further calculations. In case the current counter value on the server is 256, then we know that we have to use the previous timeslot value. And if the current counter value on server is 257, then we will use the after/next timeslot value as the value used on the client would have been 258. Further details about how the TCID is used to identify the client and how it is generated on the client side is explained further in this specification using the accompanying diagrams. The generation of UAC part which is the based on the MOTP registration and generation as explained generically before is not discussed here in this specific example of the dynamic credit card number. As anyone with ordinary skill in the art will readily understand how that can be generated for the dynamic credit card number scheme. Please note that UAC part will be generated for each generation of the dynamic credit card number based on the end-user password or PIN and will be different for each instance of the transaction.

Figure 12:
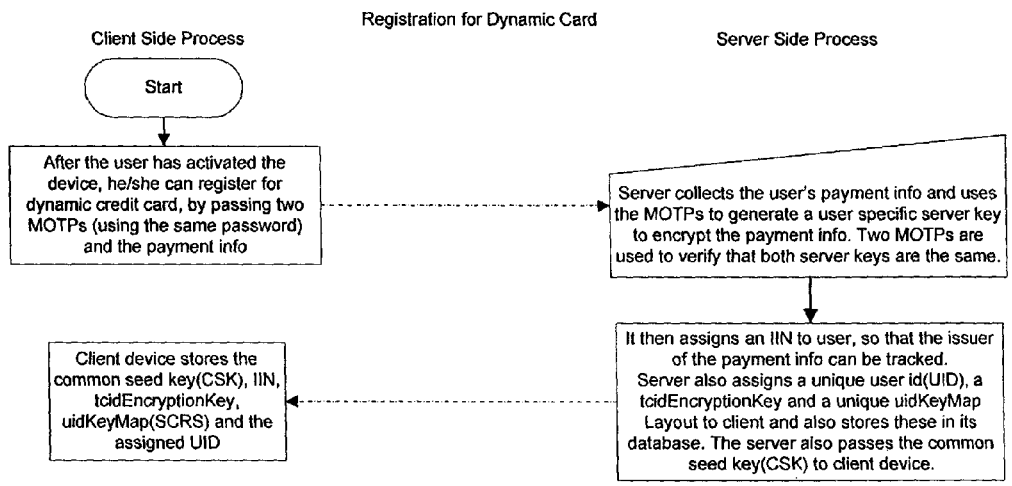
FIG. 12 is a block diagram illustrating a typical end-user registration for the dynamic credit card number in accordance with one embodiment of the invention.

FIG. 12 is a block diagram illustrating a typical end-user registration for the dynamic credit card number in accordance with one embodiment of the invention. After the end-user has activated the client device, user registers for the dynamic credit card service, by providing the financial details of the underlying payment instrument on which the purchases made with dynamic credit card will be charged. Along with payment information, the user also passes two MOTPs generated using the same password. This password is used to encrypt the payment information on server side. The payment information could be an existing credit card issued by the Bank or an existing financial account with the Bank. The server uses the received MOTPs to derive the user specific server key and uses it to encrypt the payment info on server side. The server verifies the correctness of the password, by checking that both the MOTPs generate the same server key. In case of error, user is asked to enter another set of MOTPs. The server on receipt of the payment information details, allocates a unique user id (UID) and assigns a uidKeyMap layout, let's say SCRS to the end-user device. It also assigns a random tcidEncryptionKey for each registered client. The SCRS is an ordered list of characters and UID is a unique String made up of some of the characters from the SCRS. For example, the SCRS can be made up of characters A, B, C, D, E, F, G, H, K and J. Each client is assigned a unique UID String and a uidKeyMap layout which is a permutation of the above characters. The assignment of UID string and uidKeyMap layout (SCRS) to each client is done by the server such that at any given time-slot, the value of UID string is unique across all registered clients and the resultant position mapping array of those UID characters in the assigned SCRS of the client is also unique across all the registered clients. Also based on the payment info received the server also assigns an IIN to the client device. This IIN is used to route the dynamic credit card number through the credit card interchange network to the correct issuer who has the server side module of the dynamic credit card system installed.

Figure 13:
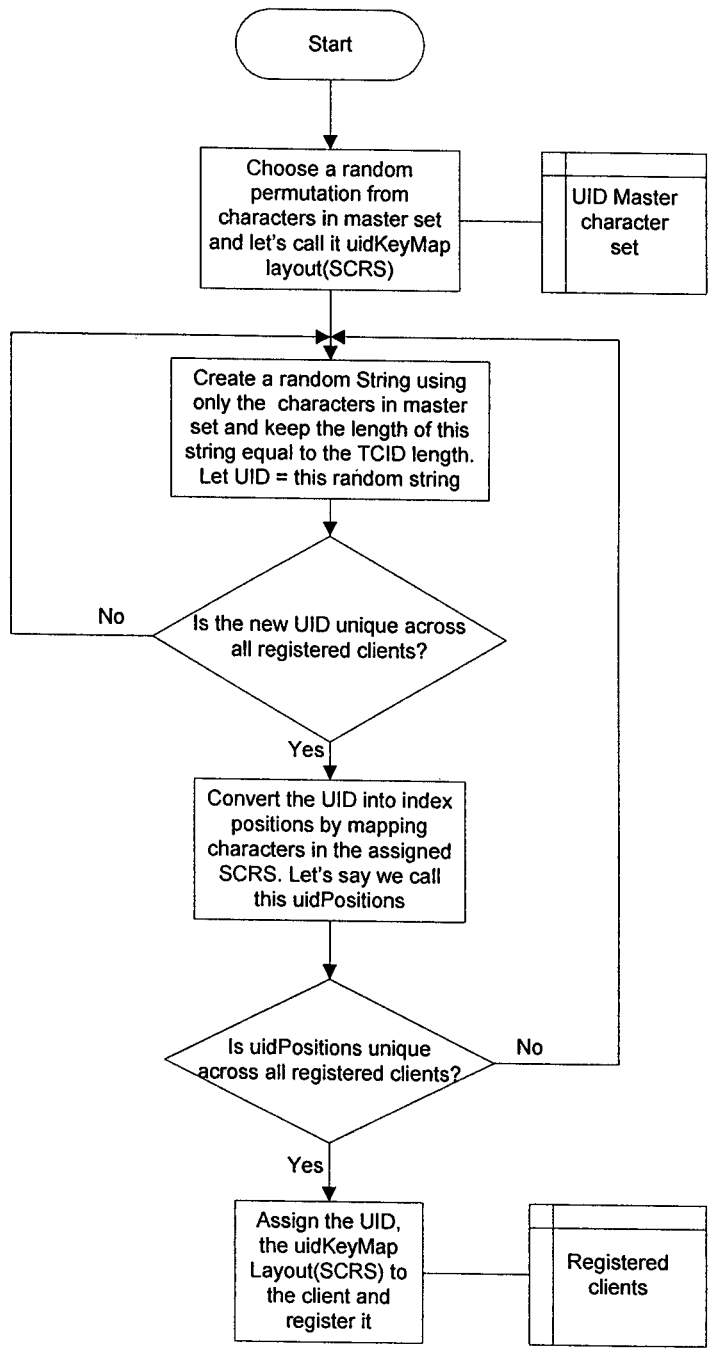
FIG. 13 is a flow chart illustrating the generation of UID and SCRS on server side during registration for dynamic credit card in accordance with one embodiment of the invention.

FIG. 13 is a flow-chart illustrating the generation of UID and uidKeyMap layout (SCRS) on the server side during registration of a new client for dynamic credit card. The system creates a random permutation of characters from the master set for use with the new client and this is referred to as uidKeyMap layout (SCRS). Next the system generates a random string from the characters in the master set and the length of the string is kept equal to the length of the TCID. Let's refer to this string as associated UID. Next check if the UID is not used before i.e. it is unique across all the registered clients. If the UID is already used, then go back and select another random UID. If the UID is unique, then map the UID to index positions—uidPositions, by mapping the UID characters to their respective index positions in the assigned SCRS. Next check if the uidPositions value is unique across all the registered clients. If uidPositions value is not unique, then go back to the step of creating UID and choose a new random UID. If the uidPositions is unique and not conflicting with any of the existing registered clients, then the user has found the UID and the uidKeyMap layout (SCRS) which can be assigned to the newly registered client. The method stores the uidKeyMap layout (SCRS) and its associated UID and uidPositions on the server side and link those values to the registered client. A random client specific tcidEncryptionKey is also assigned and passed to the registered client so that the client can encrypt the TCID value. A common seed key (CSK) is also passed to the registered client so that the client can perform transformations on the assigned SCRS in synchronization with the server.

Figure 14:
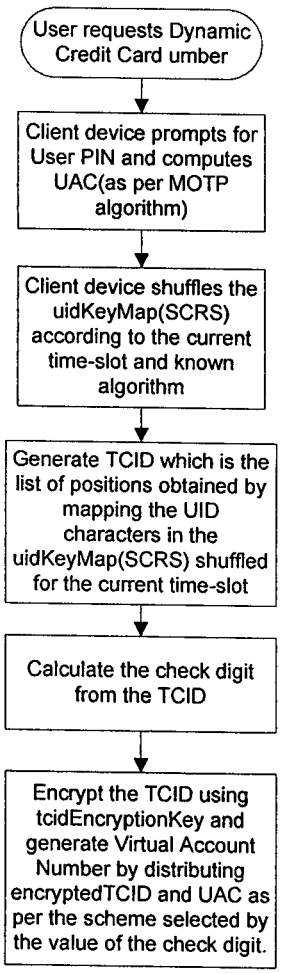
FIG. 14 is a block diagram illustrating the generation of the Virtual Account Number part of the credit card number on the client device in accordance with one embodiment of the invention.

FIG. 14 is a block diagram illustrating the generation of the Virtual Account Number part of the dynamic credit card number on the client device. The method starts when end-user requests a dynamic one time use credit card number. The client application prompts the user to enter a PIN using one of the password input method and it then generates the MOTP as described earlier. This MOTP is used as the User Authentication Code (UAC). The client application then shuffles the stored uidKeyMap (SCRS) according to the current timeslot value and a known algorithm. This shuffling of the SCRS is common across all clients and uses the same known algorithm for all clients. However the SCRS and UID assignment for each client is different and hence each client generates a unique TCID at any given timeslot. The TCID is generated as the list of positions obtained by mapping the UID characters in the SCRS shuffled as per the current timeslot. A check digit is also calculated for the TCID value and then TCID is encrypted using the tcidEncryptionKey. The check digit value is used to determine a scheme for distributing the encrypted TCID and UAC digits in the virtual account number field. This way the digits of the encrypted TCID and UAC will be at different positions within the virtual account number field for different clients and it may also change for each transaction. For example, let's say the check digit value is 2, then the encrypted TCID value can start at position 2 within the virtual account number and remaining part of the virtual account number can be wrapped around. This way the virtual account number field is used as a circular array with the start position of the encrypted TCID value dependent on the check-digit value. Any scheme which provides variations of the positions of the encrypted TCID and UAC values within virtual account number based on the check digit can be used. Since the client and server are aware of the expected check-digit value for every time-slot, they can determine the actual positions. However an adversary without knowledge of this will find it difficult to predict the actual positions of the encrypted TCID and UAC within the virtual account number field, thereby making the cryptanalysis difficult.

In one of the preferred embodiment the 6-digit TCID could be encrypted using a Hill Cipher with 3×3 matrix as the key. We would use an alphabet of length 97, which will include the numbers from 0 to 96. We would use modulo 97 arithmetic and each character in the alphabet is represented by a character string formed of two digits like from 00 to 96. The TCID is then assumed to be 3 characters of 2 digits each, for example 234589 is treated as three character '23', '45 and '89' and these are mapped to the corresponding number from the modulo 97 range. Now since the alphabet has only 97 characters instead of the 100 characters needed for the decimal numbers 0 to 99, we would put a restriction on the UID (in effect on the TCID) such that TCID will not contain any of the characters from the set 00, 11, 22, 33, 44, 55, 66, 77, 88 and 99. This way the input TCID will not have any of these characters and hence it can be mapped to an alphabet which has only 97 characters. Also the characters 97 and 98 in the input TCID will be mapped to a character thus freed within the above alphabet character range such as 11 and 22. After decryption the mapping will be reversed to map those characters back to 97 and 98. The use of Hill cipher will hide any single digit or double digit pattern in the input TCID. And since the input TCID keeps changing for each transaction, any adversary will not be able to predict the input text of the Hill cipher for the given encryptedTCID. Though Hill cipher is easily broken for a known plain-text attack, it is secure against the cipher-text only attack. And since in our case the plain-text (input TCID) is not known it is not possible for an adversary to decipher the Hill cipher key from only cipher-texts (the encryptedTCID values). It provides perfect security for our preferred embodiment. Also the use of a larger alphabet with length of 97 and a 3×3 matrix provides more key space for the Hill cipher key. Now though the input TCID is always unique for a given client in a given timeslot, when that is encrypted using different client specific keys there are chances of collisions for the encryptedTCID value. We have to use an encryption algorithm which provides minimum collision for the set of registered clients. In case of collisions, the server will then use the UAC part of the virtual account number or additional information such as AVS or CV to further narrow down the list of possible clients. In case where even after using UAC or any other available information to distinguish between the clients who have resulted in collision, the doubt still remains then the server will reject the transaction. In that case the client will have to re-generate a new dynamic card number and submit the transaction with new card number. The probability that a collision occurs after a few rounds is extremely small.

Figure 15:
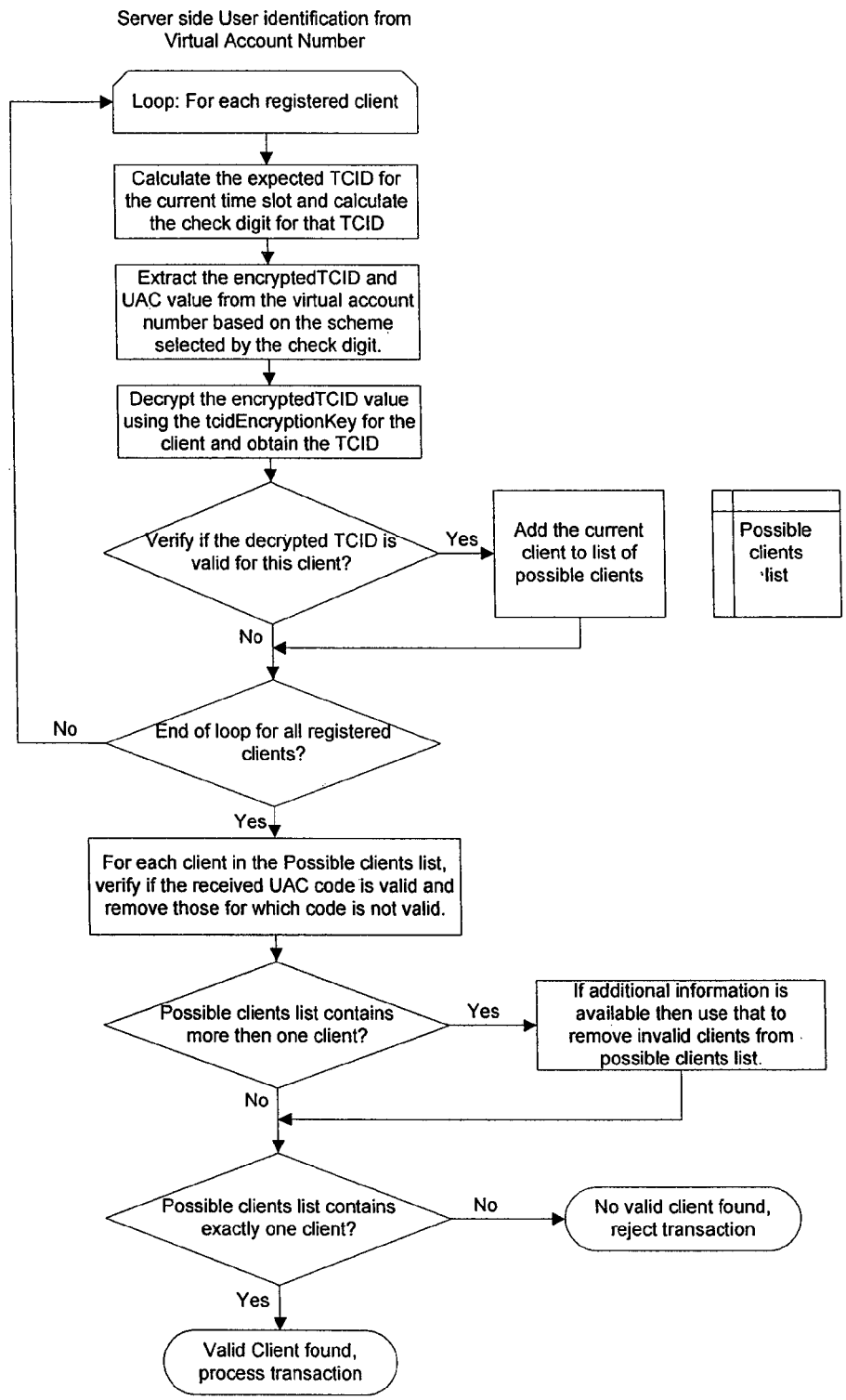
FIG. 15 is a flow chart illustrating the identification of the client from the Virtual Account Number on the server side in accordance with one embodiment of the invention.

FIG. 15 is a flow-chart illustrating the identification of the client from the virtual account number received as part of the dynamic credit card number on the server side. For each registered client the server calculates the expected TCID value by applying the transformation matrix for the current timeslot on the associated uidPositions for that client and determines the check digit. Then based on the check digit value the encryptedTCID value and UAC is extracted from the virtual account number field of the credit card number. Then the encryptedTCID value is decrypted using the tcidEncryptionKey for that client to obtain the TCID value. The server then calculates the UID String for that client by mapping the positions in TCID to the characters in the corresponding uidKeyMap (SCRS) and if the generated UID String matches the associated UID string value then the TCID value is considered valid for that client. If a valid TCID value is found for a client from the given virtual account number, then that client is added to the list of possible clients. These calculations are done for each of the registered clients and all the possible clients are found. In case there are more then one possible clients in the list, then the server further checks the UAC code for each of those conflicting clients and tries to eliminate the clients for which the UAC code obtained from the virtual account number is not valid. Very unlikely, but in case, even after this last step there are more then one possible clients, then if the merchant has provided additional information such as AVS (Address Verification Data) or CVV or CVV2 data for the customer then that is used for identifying the actual client. If this additional data is not available, then in these cases of virtual account number collision, the server will reject the current dynamic card number. User will then have to re-generate a new dynamic credit card number and attempt the transaction again. The probability that a collision occurs after a few rounds is extremely small. Because of the way the UID values are assigned and uidKeyMap layouts are assigned to the registered clients, for any valid TCID value, only one of the entries in the uidKeyMap entries list will match against the stored associated UID value. Hence all registered clients will always generate a unique TCID value which is different for each time slot. Since the TCID value is different and it is further encrypted before embedding it in the virtual account number, it is extremely difficult for an adversary to deduce any pattern from the past virtual account numbers or predict the future ones.

Figure 16:
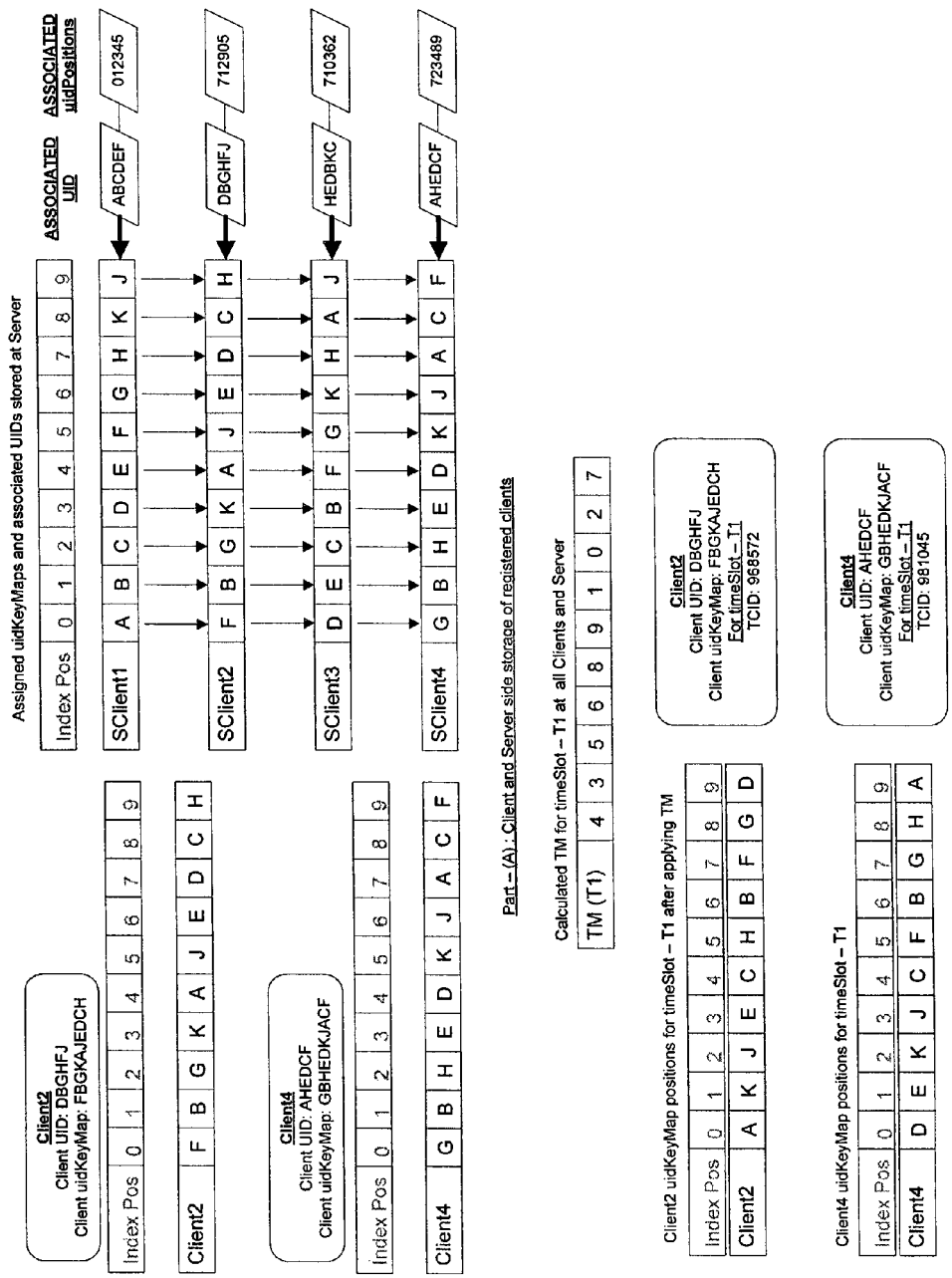
FIGS. 16A and 16B shows an example showing UID, SCRS and TCID usage as part of the dynamic credit card system in accordance with one embodiment of the invention.
Figure 16:
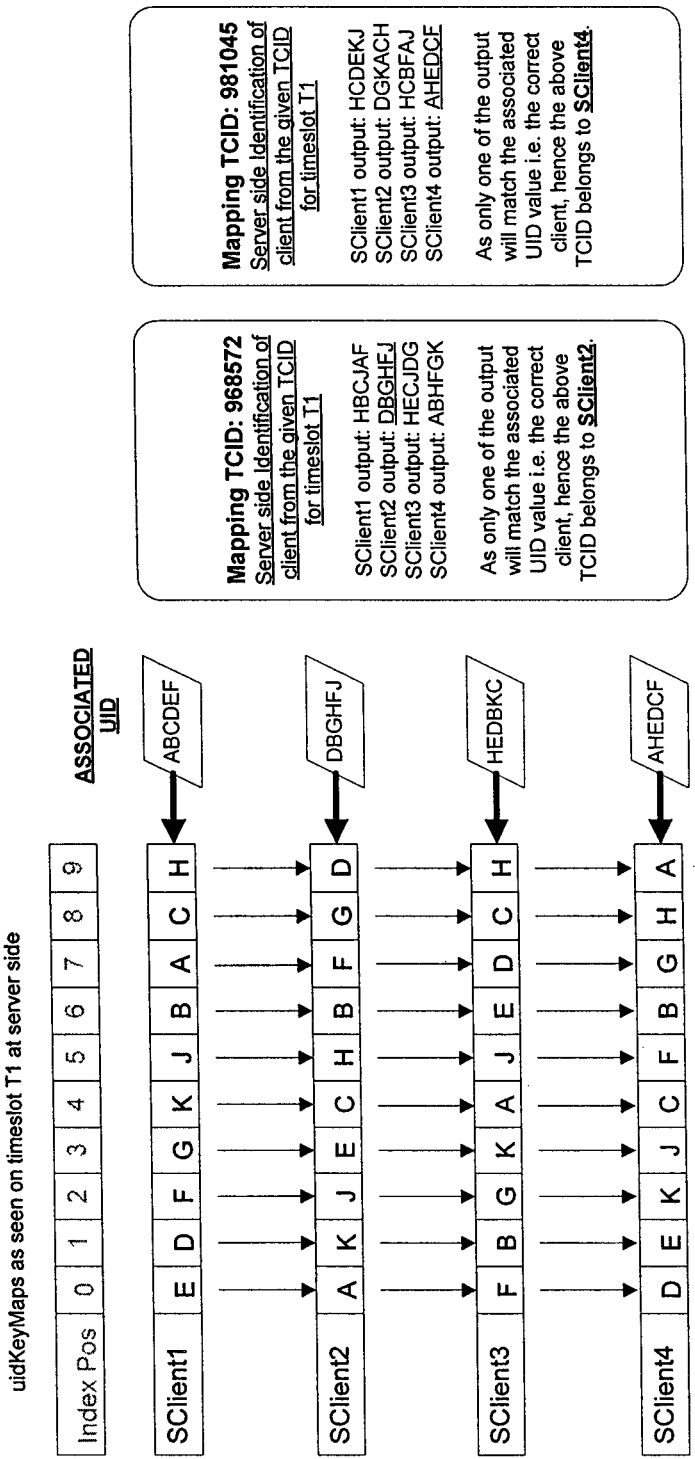

The assignment of unique uidKeyMap layouts and associated UID to each registered client, will become more clear when explained with an example as shown in the FIG. 16. The Part (A) of the diagram in FIG. 16 shows that on the server side, four clients have registered and they are assigned uidKeyMap and UIDs as shown. The master character set has 10 items, consisting of characters A, B, C, D, E, F, G, H, K and J. The Client2 is assigned UID "DBGHFJ" and uidKeyMap layout (SCRS) of F, B, G, K, A, J, E, D, C and H in the index positions 0 to 9 respectively. Similarly Client4 is assigned UID "AHEDCF" and uidKeyMap layout (SCRS) of G, B, H, E, D, K, J, A, C and F in the index positions 0 to 9 respectively. The Part (B) of the diagram in FIG. 16, shows the transformation matrix TM as calculated for timeslot T1. It also shows how the individual clients will shuffle the SCRS assigned to them for the timeslot T1. Now for example, when Client2 wants to generate the TCID, at timeslot T1, it will map its assigned UID which is "DBGHFJ" to index positions as per the SCRS shuffled accordingly to the transformation matrix for timeslot T1. When it does that, it will produce the TCID value of "968572". The software client application on the user device will use this TCID when generating the dynamic credit card number when the same is requested by the end-user on timeslot T1. Similarly, Client4 will generate the TCID value of "981045" for the same timeslot. The Part (C) of the diagram in FIG. 16 shows how the server can identify the actual client from the TCID obtained from the credit card number. As shown in the diagram, the server will map the received TCID to a character string by mapping the positions to characters in each of the uidKeyMaps (SCRS) stored for the registered clients. The resultant character string will be matched against the stored associated UID for each of SCRS of the registered clients. Only when the authorized client had generated the TCID by mapping the assigned UID to index positions in the assigned uidKeyMap (SCRS) shuffled according to the timeslot, will it produce the resultant character string which will match against the stored associated UID value for that client on the server side. Hence, the server can identify the SCRS entry and hence the associated client from the given TCID. Also as the UID assignment was done such that it is unique across all registered clients and also the shuffling as per the timeslot occurred uniformly for all the registered client's uidKeyMaps (SCRS), at any particular timeslot, there will be only one resultant string which will match the associated UID. Thus the present invention provides a way by which a time based dynamic id (TCID) can be assigned to each registered client and on receiving that id (TCID), the server can identify the client from it. Further the TCID will be encrypted using a client specific encryption key (tcidEncryptionKey) and a check digit will be calculated based on the TCID. The value of this check digit will determine the scheme used to distribute the encryptedTCID and UAC within the virtual account number field of the dynamic credit card number. Also as SCRS and UID assigned to each client is not revealed, but only encrypted value of the time changing TCID is passed in the credit card number, it is extremely difficult to predict the virtual account number or deduce any pattern from the past numbers. Also it is not possible to infer the SCRS and UID for a client by just observing the virtual account number passed in the credit card number, without having more information. Again the SCRS and UID are different and unique for each client, hence even if one of the clients is compromised; the adversary will not be in a position to generate the virtual account number for other clients. At most using the information obtained from the compromised client, an adversary can generate some part of the virtual account number, specifically the TCID, and that too only for the compromised client. Further since the UAC which is part of the virtual account number and is dependent on the user's password as well as the number of times card number is generated on the device and further the user's password is not stored on the client device, the adversary will not be able to produce a valid UAC code. Hence this dynamic credit card system as explained in the present invention does provide robust security even against the compromise of the client device.

In accordance with another embodiment of the present invention, the dynamic time based client/user identification number along with MOTP can be used to generate onetime use limited validity financial Transaction Authorization Number (TAN) for facilitating a user device payment system. In this user device payment scenario a registered end-user (payer) can enter the PIN, Amount and restriction mode for the payee on the client application and the client application will generate a TAN number. The TAN number is then given to the payee for effecting the payment. The Payee who is pre-registered in the system, sends the TAN number, Amount of the Transaction and other details about the transaction to the server. The server then validates and authenticates the payer from the given information and provides a payment confirmation to the payee. With this system a payer can pay a payee by just giving the one time use TAN number without disclosing any of the sensitive financial information to the payee.

Figure 17:
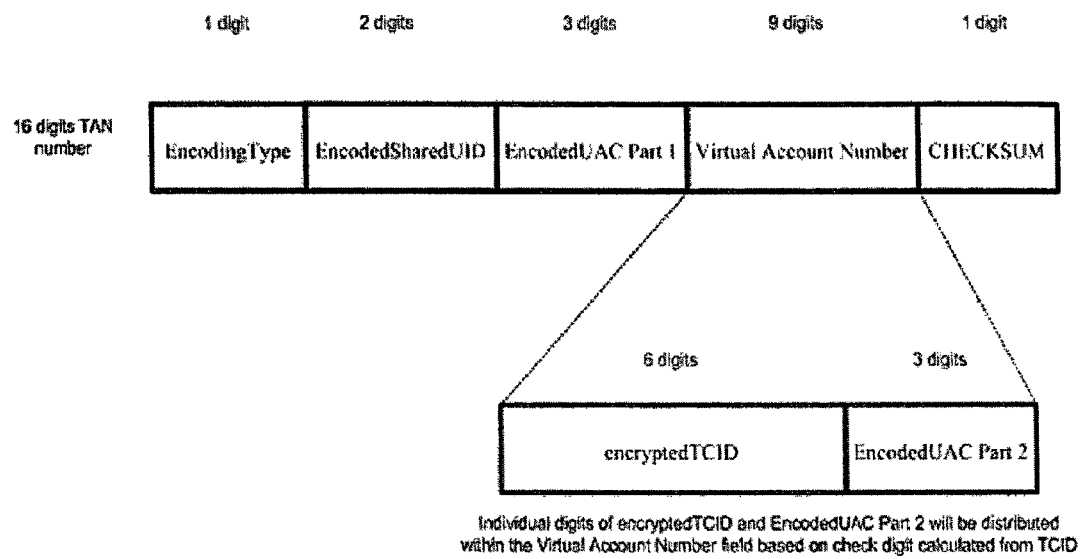
FIG. 17 shows a 16-digit TAN numbering scheme in accordance with one embodiment of the invention.

FIG. 17 shows a 16-digit TAN numbering scheme in accordance with one embodiment of the invention. The payer enters the PIN, Amount and type of restriction in the client application to generate the financial authorization (i.e. TAN) which includes virtual account number, wherein the financial authorization may have any number of digits (preferably 16 digit number). The financial authorization is formed using different parts which are encodingType, encodedSharedUID, encodedUAC (Part 1), Virtual Account Number (consisting of encodedUAC (Part 2) and encryptedTCID) and check digit. Now let's understand how each of the part is calculated. The MOTP (UAC) is generated from the user (payer) PIN as explained earlier. The encryptedTCID is also generated on the client side as explained earlier for the dynamic credit card example.

The encodingType is a one digit number representing the encoding scheme used for encoding the Restriction, Amount and MOTP (UAC). There are three different restriction modes that can be applied to TAN to restrict its usage by the payee. These are:

(a) None: This means the financial authorization can be used at any type of merchant (payee) with no restrictions. This is represented by the restrictionType value of 0.

(b) One of the given category (Online, Food, Petrol, etc. . . . ): This puts a restriction such that the financial authorization can be only used with the merchant (payee) who falls in the same category of the merchant as selected by the user (payer). This is represented by the restrictionType value of 3 and the restrictionMask is set to the pre-defined 4 digit category code value of the merchant. For example, the value of the restrictionMask will be 0001 for Online Merchant, 0002 for Movie Merchant, 0003 for Food Merchant, 0004 for Petrol Merchant, 0005 for EndUser etc.

(c) Specific: This puts a restriction such that the financial authorization can be only used with the specific merchant code selected by the user (payer). This is represented by the restrictionType value of 6 and the restrictionMask is set to the 4 digit code value entered by the user (payer). For example to restrict the payment through financial authorization to a particular Mobile number based merchant (payee), user (payer) can enter the last four digits of the mobile number of the merchant as the specific merchant code value and it will be set as the restrictionMask.

The encodingType digit in the financial authorization is generated by combining the restrictionType with the modulo 3 value of the time-slot based counter value used for the dynamic time based user/client identification. For example, let's say the modulo 3 value of the time-slot is 2 and the Restriction Mode selected by user is Movie. So we will have restrictionType value of 3 and restrictionMask value of 0002. Then the encodingType digit will be calculated as given below:

$$encodingType = modulo\ 3\ of\ counter\ value + restrictionType = 2 + 3 = 5$$

The Amount value is further separated into the integral and fractional part. The integral part of the amount value is combined with MOTP value and the restrictionMask to obtain the encodedUAC value. The encoding process used for calculating the encodedUAC is a reversible encryption and one, which generates the same number of digits/characters as in the MOTP. In the preferred embodiment the modulo 10 addition can be used for encryption and modulo 10 subtraction can be used for the decryption. First the integral part is encrypted with the MOTP value and then if the restrictionMode is other than None, then the resultant value is further encrypted with the restrictionMask value. Thus obtained encodedUAC value is then divided into two parts and encodedUAC Part2 is used along with encryptedTCID to form the Virtual Account Number field in financial authorization. How the Virtual Account Number is generated is explained earlier in this document and is not repeated here. Only instead of the Partial UAC value, in this case the encodedUAC Part 2 value is used.

The SharedUID is a two digit number used capture additional digits when assigned UIDs are more then 6 digits. The fractional part of the amount value is encoded with sharedUID to obtain the encodedSharedUID. Again the encryption process used here is a reversible encryption and one, which generates the same number of digits/characters as in the sharedUID.

The last digit in the financial authorization is the check-digit calculated according the Luhn's algorithm and is used to validate the financial authorization against simple typing errors.

Figure 18:
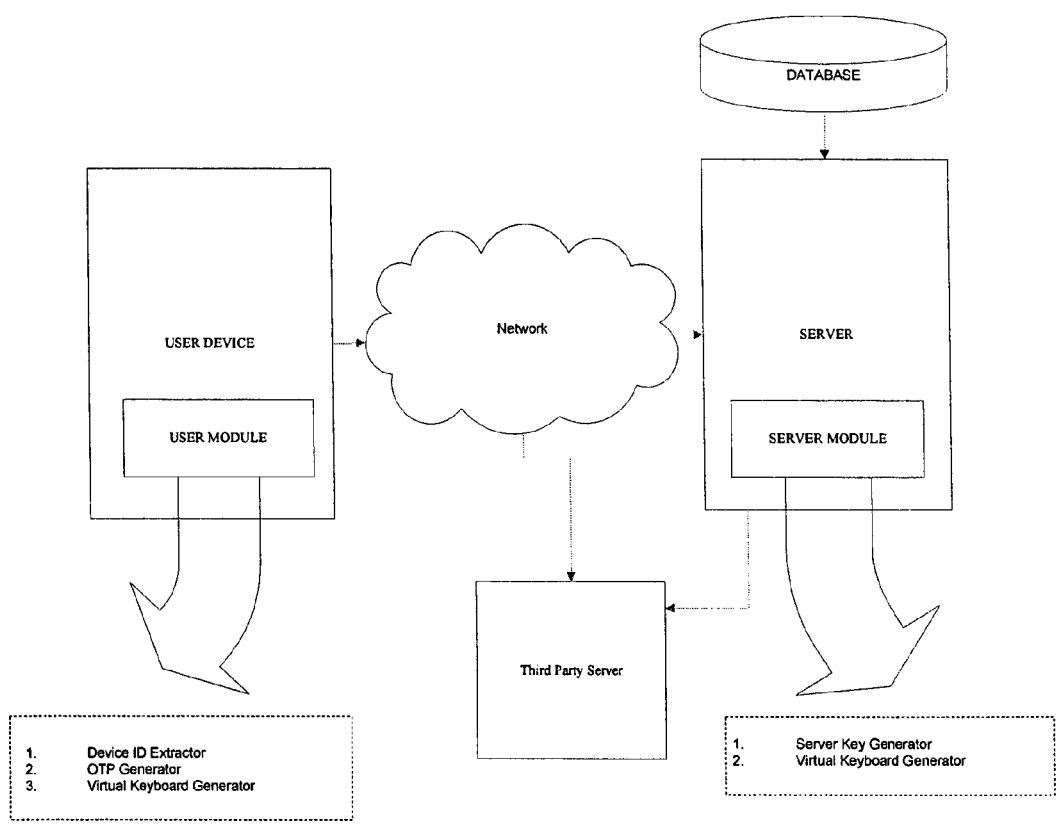
FIG. 18 illustrates a system for generating a strong multi-factor key at the server using a user password.

FIG. 18 illustrates a system for generating a strong multi-factor key at the server using a user password. The system includes a user device, a server and a database. The system also includes a communication network and a third party server which is linked with the network. The user device comprises a user module which is capable for device ID extractor, One Time Password (OTP) generator and a Virtual Keyboard Generator. The server comprises a server module, where server module comprises a server key generator and a virtual keyboard generator. The database is coupled to the server which is capable of storing the data. The network is a communication network which links between the user device and the server device. The communication network is also link to one or more third party server for providing services.

In an example operation, the system provides a strong second factor based password generation on the server for encrypting the data without transmitting or storing it anywhere. The system provides a secure second factor based server key derived from the user password. The system where in the PIN/Password is not stored on the user device and as well as on the server. It provides a way to transmit a modified PIN/Password in terms of an MOTP (PIN positions masked in OTP). On the server the MOTP is used to generate a server side password which is different from the user's password however depends on it. This server side password is used to encrypt the confidential data on server and that encrypted data is stored on the server without storing the password. An MOTP generated from the wrong user password or an MOTP generated on a different client device with correct password, will not generate the same server side password and hence cannot be used to decrypt the data on the server. Therefore a correct user password ($1^{st}$ factor) and the possession of the correct client device ($2^{nd}$ factor) are necessary to decrypt the data stored on the server. The very fact that the client device does not have any information about the valid PIN/Password; it protects the client application and prevents any misuse of the application by reverse engineering or cracking of the keys. Only the authorized person knows about the actual PIN/Password and MOTPs generated using this valid PIN/Password can only be used to decrypt the data on the server. Since a PIN/Password is not stored on server as well as client, the system provides a way to secure sensitive data on the server with strong second factor authentication.

The main principle behind the disclosure is to never store a password either in the client device or on server in its original form. The user-entered password is always transformed using a transformation-matrix on the user device before it is transmitted to server. The server uses another transformation-matrix, which is generated in a synchronized manner with client, to deduce a different password. As the client and server use synchronized transformations, the server effectively consumes the server password which is a derived from the user password without actually knowing what the password is. As long as user's password is valid, the server password is correct and this is sufficient for server to encrypt or decrypt the secured data for that client. In order to affect the transformations in a synchronized manner, the client and the server need to share some data and a running count of the current transformation being applied. Although sharing this 'seed data' is usually the weakness of such methods, this invention uses out-of-band signaling for agreeing upon a part of the shared data, thus, plugging this loophole. Further even in case where the shared secret gets compromised, since a user's password which is never stored anywhere is also required to access the secured data, the system in present invention provides much more security. Another advantage of the present invention is that the client and server transformations are non-reversible and provides for forward and backward secrecy, thereby an adversary gaining access to the current state of the client device together with the current state of the server will not be able to guess the user's password neither it will be able to generate the user's password or server password from the previous MOTP values.

This disclosure addresses and resolves issues in the Internet security domain. In that respect, it is an infrastructural solution. There are many potential Internet based applications which could be deployed due to the enhanced security infrastructure supported by this invention.

1. Secure storage: A solution first envisaged by Microsoft for storing key data for a user can be implemented using this invention. The advantage over a proprietary solution is that the data ownership and usage policies are entirely determined by the user, as only user controls the key to access the storage.

2. Multi-factor authentication: Internet applications, needing a second factor for authenticating user, can be retooled to use a ubiquitous device, such as a simple mobile phone to generate a one-time password. Currently, such two-factor authentication systems require expensive hardware devices (Tokens, Gold-cards, etc.) to generate One-Time password. It is much more cost-effective to use a user-owned communication device for this purpose and further the present disclosed invention does not store user's password on it, thereby protecting the user data even when the device is stolen or hacked into.

3. One Time Use Credit Card Number: The current invention can also be used to generate a One Time Use Credit Card Number directly on the user's mobile phone. This One Time Use Credit Card Number is linked to the user's actual credit card or debit card or any other financial payment instrument. The actual financial information of the user is stored on the server protected using the user's strong server key. The One Time Use Credit Card number generated from the user's mobile phone can be used without any changes to the existing e-commerce and merchant environment. The present disclosed invention provides a second factor authenticated one time use credit card number from the convenience of user's own phone.

4. One Time Use Password facilitator/Storage for user's passwords to other sites: The current invention can also be used to generate a onetime use password which can be given to someone for granting him/her temporary access to the site. The system provides a proxy site where user will enter the one time use password generated using this invention. This proxy server then retrieves the actual password of the user which is stored protected using the user's strong server key and directs the user to actual site. This service can also be useful when the end-user wants to access site from a public place, where he need not use the actual password but rather use the one time use password to gain access to the site.

Although not required, the systems and methods for password protection are described in the general context of computer-executable instructions (program modules) being executed by a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 19:
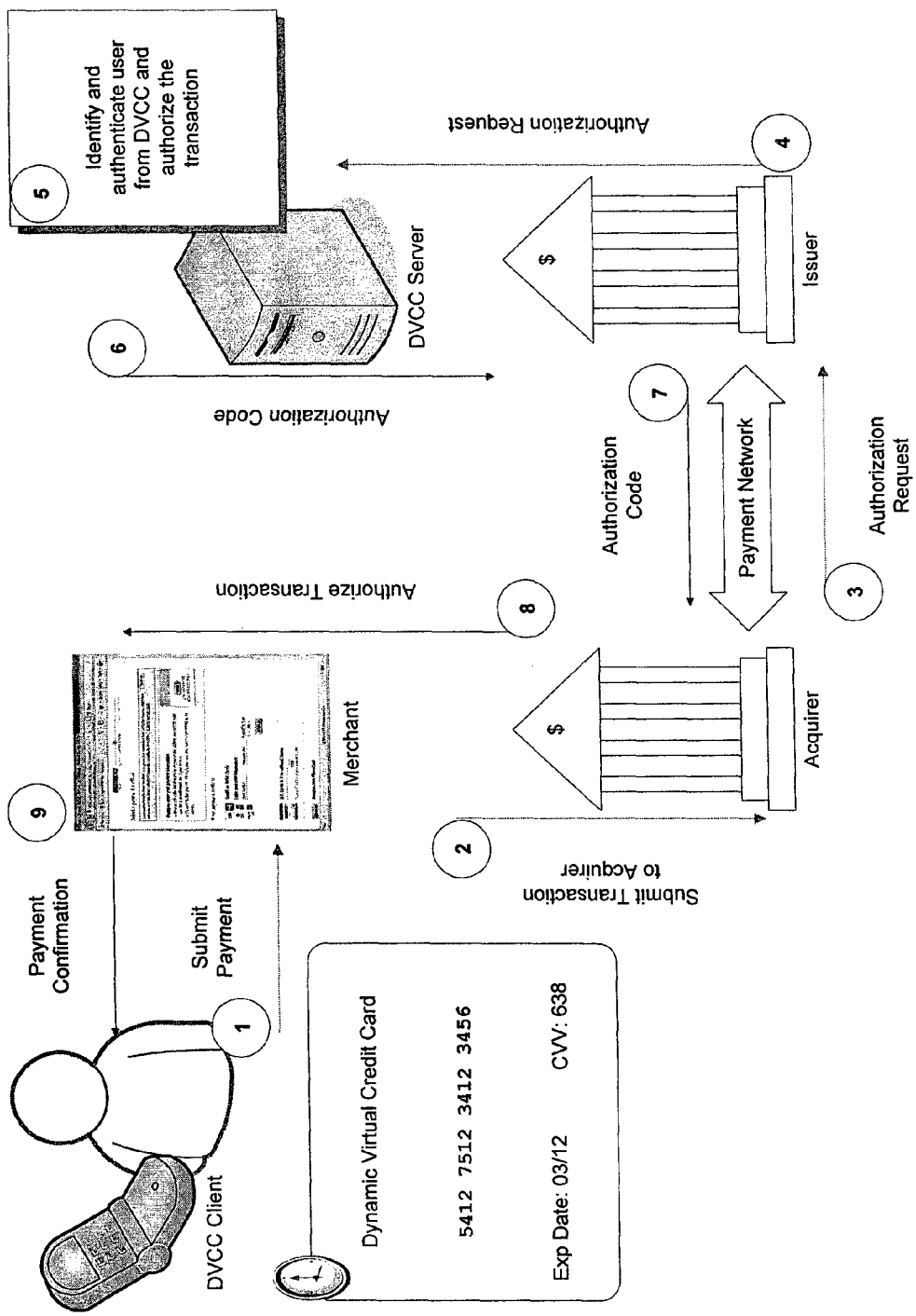
FIG. 19 illustrates a safe payment system by generating one time use dynamic virtual credit card number on a client device for performing a payment transaction, in accordance with one embodiment of the present invention.

FIG. 19 illustrates a safe payment system by generating one time use dynamic virtual credit card i.e. financial authorization on a client device for performing a payment transaction, in accordance with one embodiment of the present invention. In an example embodiment of the present invention, the safe payment system includes a client device, a server and a merchant. In order to use the dynamic virtual credit card client application, the client device requests the server to receive an application via one or more communication network. Once the client device has received or installed or downloaded the application from the server, the client device is activated to generate a shared secret key, where the shared secret key is computed from a client device specific ID and a random number generated at the client device and server. The details of the activation process are already explained in the above description. Allowing the user to register with the application of the server by the client device, where the registration process may include entry of a personal PIN (personal identification number), a personal sign message, a credit card number including expiry date, CVV number etc or any other necessary information with respect to the funding source. The user is also registered with the source funding information with the Issuer Bank (via branch, website etc). The registration process includes assigning a time based client identification number (TCID) encryption key, a unique user identification number and a unique user identification key map layout by the server to the client device. The unique identification key map layout includes a combination of unique user identification number and a key map at a particular time slot. The time based client identification number encryption key is used to encrypt the time based client identification number before embedding it in the virtual credit card number. The time based client identification number may be of 6 to 8 digits in the dynamic virtual credit card number. Once the user is done with activation and registration, the user generates a dynamic virtual credit card number on the client device by entering the PIN number and Transaction Amount. The client application generates a time synchronized dynamic virtual credit card number on the client device, where the virtual credit card number is dependent on the user PIN. The virtual credit card number generation process may include calculating a check digit from the time based client identification number, where the check digit value is used to determine a scheme for distributing the encrypted time based client identification number and part of UAC (generated from user PIN) in the virtual credit card number. Further the UAC generation may also include encoding of the MOTP with the Transaction Amount using a symmetric/reversible encryption to restrict the generated dynamic virtual credit card number to the specific transaction amount. The dynamic virtual credit card server application is installed on the issuer bank side and is used to identify and authenticate the user from the dynamic credit card number, expiry date, transaction details, CVV number or any other related information in order to authorize the transaction via one or more credit card network. For security reasons the generated dynamic virtual credit card number may expire automatically when the transaction using it is authorized or after a stipulated time period of time from its generation, whichever is earlier.

As shown in the FIG. 19, for making a purchase through any of the "card not present" scenarios such as on an online merchant, the user can use the generated dynamic virtual credit card number just as he/she would use a normal credit card. The user submits this virtual card number and other relevant data on the merchant's website. The merchant's acquirer will process that as a regular credit card and based on the BIN number will send the details to the issuer through existing payment networks. Issuer based on the dedicated BIN will identify the virtual card number and will pass on the transaction details to the dynamic virtual credit card backend server module. After verifying the virtual card number and authenticating the user, the dynamic virtual credit card backend server will check transaction against the funding accounts of the user. Based on funds availability, it will then send the authorization code to the issuer. Based on it the issuer will confirm the validity of the transaction to the merchant/ acquirer through the payment network. The dynamic virtual credit card server also logs all the transaction details and sends a confirmation alert to the user. For approved transaction the dynamic virtual credit card backend server initiates the transfer of the transaction amount from the user's registered funding accounts to the merchant's acquirer bank account. The transactions are then settled as per the standard interbank settlement protocol or interchange.

In accordance with one embodiment of the present invention, the dynamic virtual credit card generated at the client device can also be used in card present scenarios, where a NFC (Near Field Communication) based smart card reader can receive the generated credit card information through a mobile phone having the NFC chip. Though foregoing description references to NFC, it can be easily applied to any future advances in the short-range wireless technologies and the present invention can provide a more secured transaction by using a dynamic virtual credit card instead of static credit card information.

Figure 20:
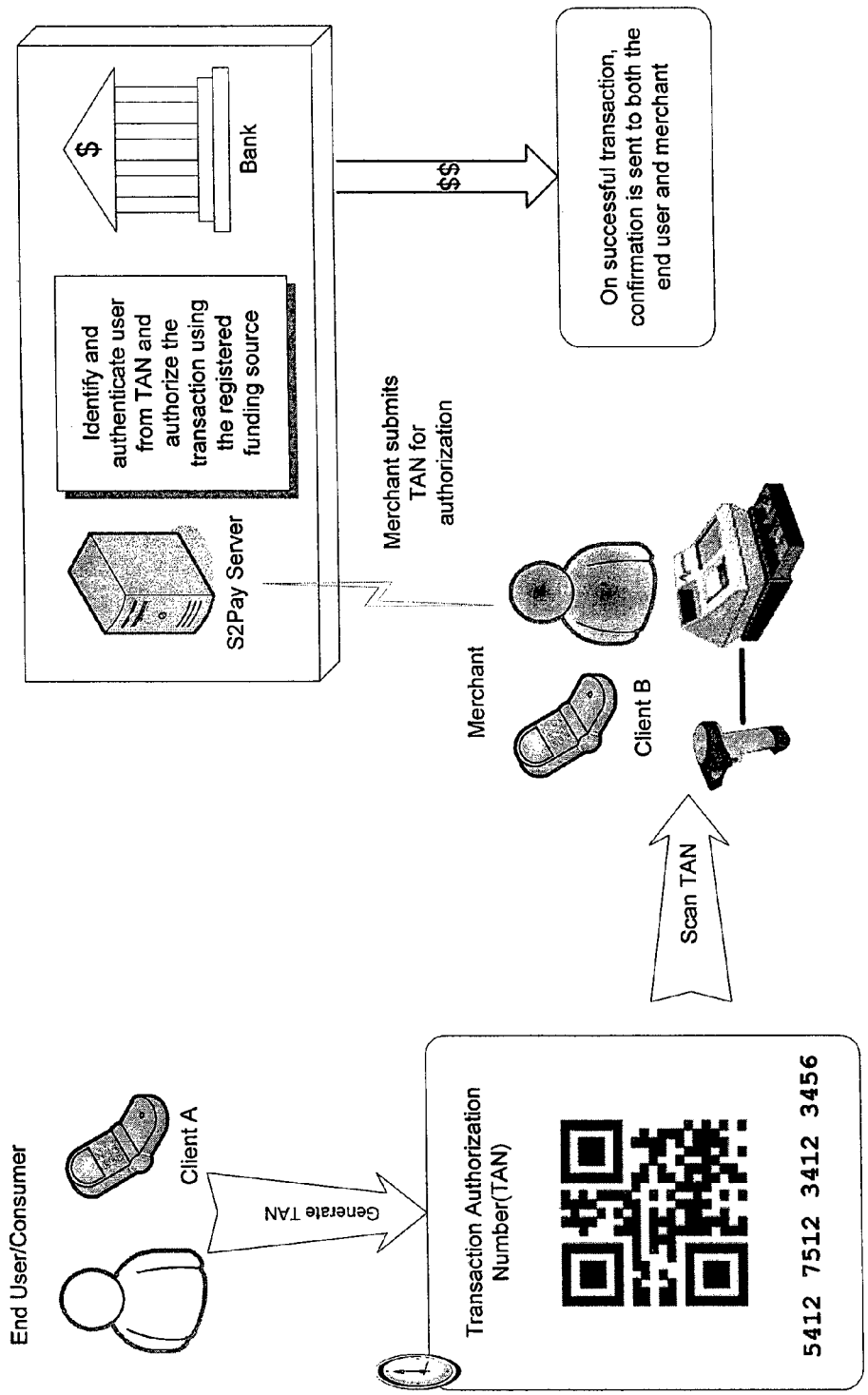
FIG. 20 illustrates a safe payment system using a user device, in accordance with one embodiment of the present invention.

FIG. 20 illustrates a safe payment system using a user device, in accordance with one embodiment of the present invention. The safe payment system includes one or more user having a user device, one or more server, one or more third party entity and one or more communication network. The user device has a user application module and the third party entity having a third party application module. In an operation, the system, the user, the server and the third party entity are configured such that, the user device application displays a first screen to show a plurality of options, where the options may be or may include a first option to pay money, a second option to receive money, a third option to request balance information and any other options which are used in transactions. Once the user has selected his/her preferred option, the user device application displays a second screen where the user is asked to enter a Personal Identification Number (PIN), a transaction amount and one of the information of the third party entity. The user device upon receiving the PIN generates a financial authorization (i.e. Transaction Authorization Number (TAN)) with a graphical representation of the same in a bar code. The TAN (TAN includes time based client identification number TCID) is a form of time dependent single use password to authorize financial transactions.

The third party entity scans the generated TAN at the client device to read the bar code or enter manually the TAN generated at the client device. The barcode may be or may include 1D or 2D barcode including EZ code, a data matrix code and a QR code. The scanning includes receiving TAN through wire or wireless communication means, and wherein the wireless communication means includes near field communication. On receiving the TAN from the third party entity, the server will verify the TAN and debit the end-user's funding source and credit the third party entity account (i.e. by validating the TAN by the server triggers the confirmation of the transactions result). The client device and the third party entity may receive an instant confirmation about the success of the transaction, where the instant confirmation could be via SMS, Email, or any other real time confirmation to the user. The third party entity is a merchant, where the merchant can be another user or any other automated terminal/machine (e.g. Point of Sale POS). The real time confirmation message to the merchant may also include some part of the user's personal sign message (which the user has registered earlier through the client application). The merchant may then verify the authenticity of the end-user by asking him/her to sign their personal sign message on the merchant copy of the receipt and verifying it with the part received in the real time confirmation message. For example, let's say user registered a personal sign message of "Blue sky" during registration, then the merchant may receive "B*u* *k*" as part of the real time confirmation message. The merchant then verifies that the user's message on the merchant copy of the receipt matches with the part received from the server (except the * chars). The merchant does not receive the full personal sign message of the user, there by preventing the merchant from faking the complete personal sign message on the receipt. This allows for non-repudiation of the transaction by the user and merchant. Further the user may also change the personal sign message from the client application at any time and register it with the server so that it will be used from that time onwards.

Figure 21:
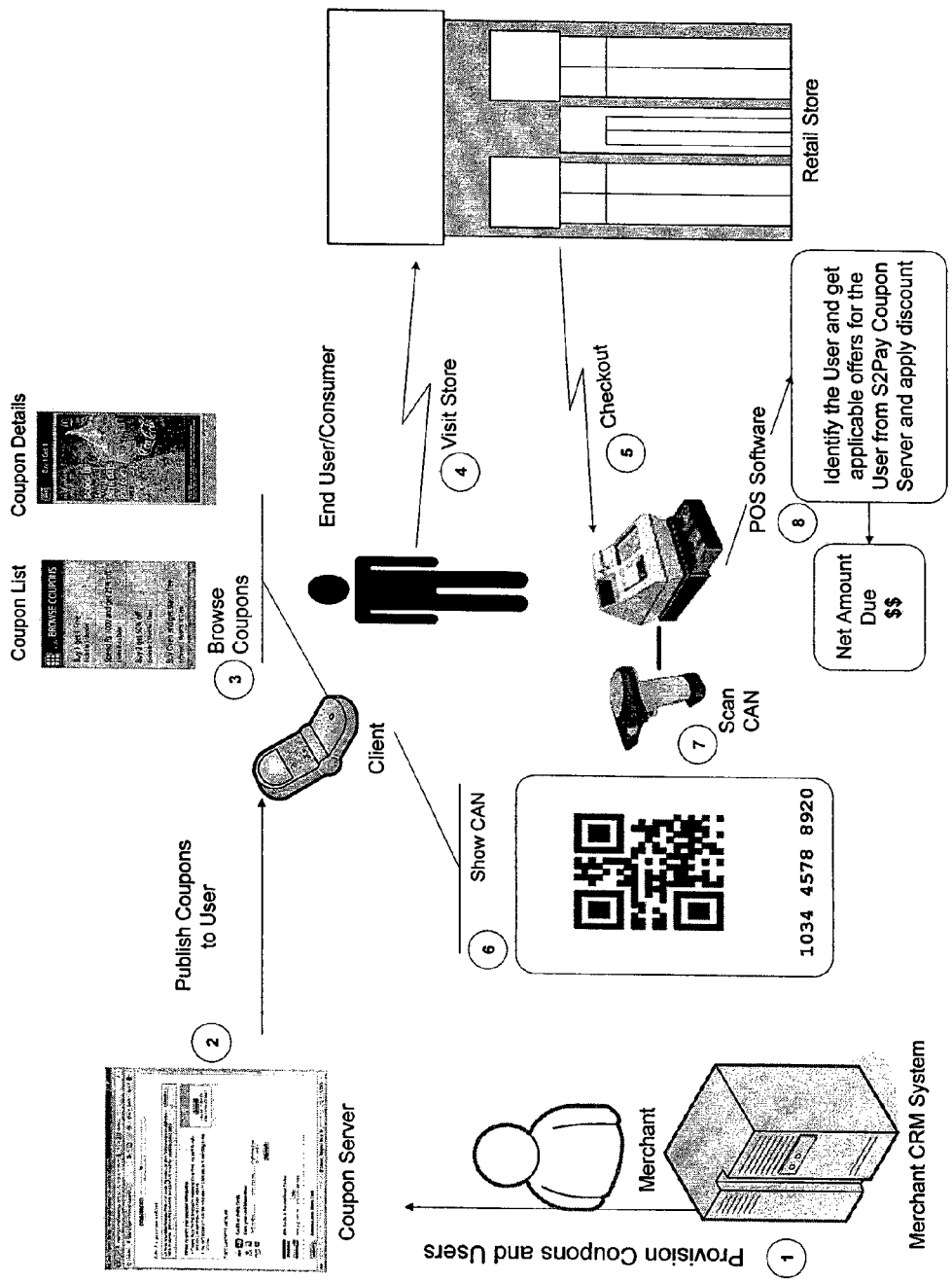
FIG. 21 illustrates a safe coupon delivery and redemption system using a user device for redeeming a coupon issued by a one or more merchant, where one or more coupons are stored at a server in accordance with one embodiment of the present invention.

FIG. 21 illustrates a safe coupon delivery and redemption system using a user device for redeeming a coupon issued by a one or more merchant, where one or more coupons are stored at a server in accordance with one embodiment of the present invention. The merchant designs the offers and uploads the coupons on the server. Based on the business rules/criteria specified by the merchant, the coupons are published or pushed to the users. First time, the user activates the device as explained earlier for the generation of the shared secret key with flow-chart in FIG. 2. During this activation (which could happen automatically without any user intervention), the server also registers this user by generating a UID and uidKeyMap layout as explained in the flow-chart of FIG. 13. For the coupon application the user is not required to register a PIN/password. The user after activating the coupon application at the user device can perceive a plurality of coupon redemption option message, where the coupon redemption option message includes information identifying the merchant and a value of the coupon. User visits the store, selects products to avail the discount or deal offered and proceeds to checkout counter. At the checkout counter, using the coupon application, the user generates a Coupon Authorization Number (CAN) with a graphical representation of the same in a bar code. The CAN is a form of time dependent single use password to authorize coupon redemption. The CAN includes the encrypted Time based client identification number (TCID) and an OTP generated on the client device, which are generated in the same way as in the virtual account number as explained earlier in the dynamic credit card example except that the Partial UAC value is replaced with the OTP generated on the client device. The CAN may have any number of digits (preferably 6 digits of TCID and 4 digits of OTP) and can also include any other additional information. The merchant scans the bar code or manually enters the CAN generated from the user device. The merchant coupon application transmits the CAN to the server and also gets appropriate offers for the user from the server and applies discount on the items purchased. On confirmation of the payment by the user, the merchant coupon application confirms the redeemed coupons to the server and server can accordingly adjust the available coupons for that user. The server identifies the user from the TCID value obtained from the CAN and further by comparing the obtained OTP value of the identified user with the expected value calculated at the server. The identification of user from the encrypted TCID value and generation of OTP as explained generically before is not discussed here in this specific example of the coupon redemption application. As anyone with ordinary skill in the art will readily understand how that can be generated for use in the current scenario. Please note that OTP will be generated for each generation of the CAN based on the client side counter of each attempt and will be different for each instance of the transaction. The Coupon Authorization Number (CAN) generation process may include calculating a check digit from the time based client identification number, where the check digit value is used to determine a scheme for distributing the encrypted time based client identification number and OTP in the coupon authorization number. The validation of CAN by the server triggers the confirmation of the transaction result at the user device and the merchant. The validation of CAN is done by identifying the user from the generated Coupon Authorization Number (CAN), obtaining the plurality of coupons stored for that particular user at the server and sending only the relevant coupons, which can be redeemed at the merchant.

Figure 22:
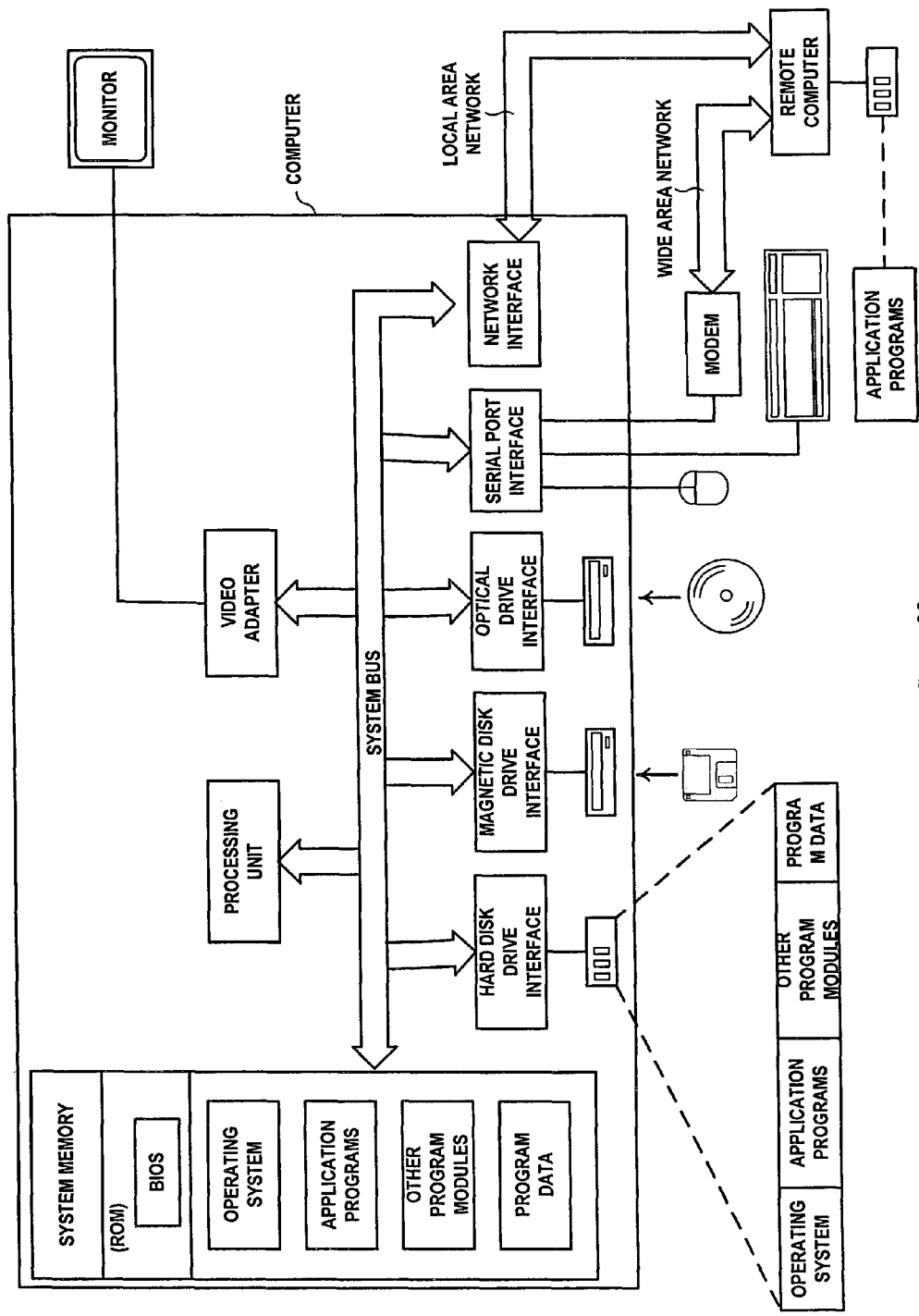
FIG. 22 illustrates an example of a suitable computing environment for password protection that may be fully or partially implemented.

FIG. 22 illustrates an example of a suitable computing environment for password protection that may be fully or partially implemented. Exemplary computing environment is only one example of a suitable computing environment for the exemplary system of FIG. 2-21 and is not intended to suggest any limitation as to the scope of use or functionality of the systems and methods described herein. Neither should computing environment be interpreted as having any dependency or requirement relating to any one or combination of components illustrated in computing environment.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 22, an exemplary system for password protection includes a general purpose computing device in the form of a computer implementing, for example, system and/or method of FIG. 2-21. The following described aspects of computer are exemplary implementations of client computing device. Components of computer may include, but are not limited to, processing unit(s), a system memory, and a system bus that couples various system components including the system memory to the processing unit(s). The system bus may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, etc.

A computer typically includes a variety of computer-readable media. Computer-readable media can be any available media that can be accessed by computer and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer.

Communication media typically embodies computer-readable instructions, data structures, or program modules, and includes any information delivery media. Combinations of the any of the above should also be included within the scope of computer-readable media.

System memory includes computer storage media in the form of volatile and/or nonvolatile memory such as read only memory (ROM) and random access memory (RAM). A basic input/output system (BIOS), containing the basic routines that help to transfer information between elements within computer, such as during start-up, is typically stored in ROM, RAM typically contains data and/or program modules that are immediately accessible to and/or presently being operated on by processing unit. By way of example and not limitation, FIG. 22 illustrates operating system, application programs, other program modules, and program data.

The computer may also include other removable/non-removable, volatile/nonvolatile computer storage media. By way of example only, FIG. 22 illustrates a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive is typically connected to the system bus through a non-removable memory interface such as interface, and magnetic disk drive and optical disk drive are typically connected to the system bus by a removable memory interface, such as interface.

The drives and their associated computer storage media discussed above and illustrated in FIG. 22, provide storage of computer-readable instructions, data structures, program modules, and other data for the computer. In FIG. 22, for example, hard disk drive is illustrated as storing operating system, application programs, other program modules, and program data. Note that these components can either be the same as or different from operating system, application programs, other program modules, and program data. Application programs includes, application programs, other program modules, and program data are given different numbers here to illustrate that they are at least different copies.

In one implementation, a user may enter commands and information into the computer through input devices such as a keyboard and pointing device, commonly referred to as a mouse, trackball, or touch pad. Other input devices (not shown) may include a microphone, joystick, game pad, satellite dish, scanner, or the like. These and other input devices are often connected to the processing unit through a user input interface that is coupled to the system bus, but may be connected by other interface and bus structures, such as a parallel port, game port, 1394/Fire wire, accelerated graphics port, or a universal serial bus (USB).

The computer operates in a networked environment using logical connections to one or more remote computers, such as a remote computer. The remote computer may be a personal computer, a server, a router, a network PC, a mobile computing device, a peer device, or other common network node, and as a function of its particular implementation, may include many or all of the elements described above relative to the computer, although only a memory storage device has been illustrated in FIG. 22. The logical connections depicted in FIG. 22 include a local area network (LAN) and a wide area network (WAN), but may also include other networks. Such networking environments are commonplace in offices, enterprise-wide computer networks, intranets, and the Internet.

When used in a LAN networking environment, the computer is connected to the LAN through a network interface or adapter. When used in a WAN networking environment, the computer typically includes a modem or other means for establishing communications over the WAN, such as the Internet. The modem, which may be internal or external, may be connected to the system bus via the user input interface, or other appropriate mechanism. In a networked environment, program modules depicted relative to the computer, or portions thereof, may be stored in the remote memory storage device. By way of example and not limitation, FIG. 22 illustrates remote application programs as residing on memory device. The network connections shown are exemplary and other means of establishing a communications link between the computers may be used.

The present disclosure may be implemented with a variety of combination of hardware and software. If implemented as a computer-implemented apparatus, the present disclosure is implemented using means for performing all of the steps and functions described above.

The present disclosure can be included in an article of manufacture (e.g., one or more computer program products) having, for instance, computer usable media. The media has embodied therein, for instance, computer readable program code means for providing and facilitating the mechanisms of the present invention. The article of manufacture can be included as part of a computer system or sold separately.

FIGS. 1-22 are merely representational and are not drawn to scale. Certain portions thereof may be exaggerated, while others may be minimized. FIGS. 1-22 illustrate various embodiments of the disclosed invention that can be understood and appropriately carried out by those of ordinary skill in the art.

In the foregoing detailed description of embodiments of the invention, various features are grouped together in a single embodiment for the purpose of streamlining the disclosure.

ADVANTAGES

The above described invention improves the security of an Internet based system. It allows for more secure access to data, a second-factor authentication and encryption using a general purpose communication device leading to less expensive and easier to deploy applications.

The other advantages of the above described invention includes reduction in costs, strong second factor authentication, safe payment without disclosing sensitive financial information to merchant, faster checkout, protection against device theft, non repudiation, marketing budget utilized for the targeted population only, increase in customer engagement and retention, real time dynamic offers, location based offers and efficient coupon management (for coupon type facility) etc.

I claim:

1. A method of generating a multi-factor encryption key using a simple password in order to access control over information stored at a second entity from a first entity via at least one communication network, the method comprising:

having a pre-installed application or requesting to receive an application at the first entity from the second entity via the communication network;

activating the first entity to generate a shared secret key, wherein the shared secret key is computed from a first entity specific ID and a random number generated at the first and second entity; and allowing the user to register with an application of the second entity by the first entity, wherein the registration includes:

entry of a password on the first entity, and generating a multi-factor encryption key on the second entity, based on a second entity view of the user-entered password, wherein the step of registration with the application of the second entity by the first entity comprising:

initializing once on the first and second entity to generate a random ordered collection of items using a cryptographic random string generator, wherein the random ordered collection of items includes bytes, images, voices, characters;

mapping the received user password at the first entity to an ordered list of index positions as per the items positions in the ordered collection of items;

transmitting the list of index positions to the second entity;

mapping the received list of index positions to the corresponding items in the random ordered collection of items of the second entity in order to decipher the second entity's view of the password entered by the user at the first entity and to derive user specific second entity key; and shuffling the random ordered collection of items of the first entity pseudo randomly after each password entry, and the random ordered collection of items of the second entity after each authentication attempt such that the shuffling is in synchronization with the first entity, wherein the user entered password is always transformed using the random ordered collection of items on the first entity before it is used on the second entity, and wherein the second entity uses another random ordered collection of items to deduce a different password, which is generated in a synchronized manner with the first entity, and at least one of the method steps is implemented by a hardware processor.

2. The method of claim 1, wherein the ordered list of index positions of the user password received at the first entity is encrypted with a One Time Password (OTP) to generate a Masked One Time Password (MOTP), wherein the MOTP is a verifier based on the user password and used on the second entity side to decipher the second entity's view of the user password.

3. The method of claim 1, wherein the receiving of user password at the first entity is through selection of items in a rotary format layout including of characters, graphics, bytes, images, and voices.

4. The method of claim 1, where the method does not store the user entered password either in the first entity or on the second entity in its original form.

5. The method of claim 1, wherein the first entity is a user, client device and or a merchant, and wherein the second entity is a server including one or more application modules.

6. A safe payment method by generating a dynamic single use authorization on a client device for performing a payment transaction, the method comprising:

having a pre-installed application or requesting to receive an application at the first entity from the second entity via the communication network;

activating the client device to generate a shared secret key, wherein the shared secret key is computed from a client specific ID and a random number generated at the client device and server;

allowing a user to register with the server by the client device, wherein the registration include entry of a password, on the client device and generating a multi-factor encryption key on the server, based on a server side view of the user-entered password, wherein the step of registration with the application of the server by the client device comprising:

initializing once on client device and server to generate a random ordered collection of items using a cryptographic random string generator, wherein the random ordered collection of items includes bytes, images, voices, characters;

mapping the received user password at the client device to an ordered list of index positions as per the items positions in the ordered collection of items;

transmitting the list of index positions to the server;

mapping the received list of index positions to the corresponding characters in the random ordered collection of items of the server in order to decipher the server side view of the password entered by the user at the client device and to derive user specific second entity key; and shuffling the random ordered collection of items of the client device pseudo randomly after each password entry, and the random ordered collection of items of the server after each authentication attempt such that the shuffling is in synchronization with the client device, wherein the user entered password is always transformed using the random ordered collection of items on the client device before it is used on the server, and wherein the server uses another random ordered collection of items to deduce a different password, which is generated in a synchronized manner with the client device; and generating a time synchronized single use financial authorization on the client device, wherein the financial authorization includes a time based client identification number (TCID) and verifier (MOTP) to authorize financial transactions, and wherein the financial authorization is dependent on the user password.

7. The method of claim 6, wherein the financial authorization generated at the client device includes virtual account number, wherein the financial authorization could be represented as a dynamic virtual credit card or a TAN.

8. The method of claim 7, wherein if the financial authorization for use in a credit card network, the financial authorization includes dynamic virtual credit card number, expiry date, CVV or any other related information of the credit card.

9. The method of claim 7, wherein if the financial authorization for use at a merchant having the application, the financial authorization is a TAN, where the TAN is represented graphically as a bar code.

10. The method of claim 6, further comprising:
at the server, identifying to authenticate the client device for a transaction from the financial authorization.

11. The method of claim 6, wherein the step of registering comprising:
assigning a time based client identification number (TCID) encryption key, a unique user identification number and a unique user identification key map layout by the server to the client device, wherein the unique identification key map layout includes a combination of unique user identification number and a key map at a particular time slot.

12. The method of claim 11, wherein the time based client identification number encryption key is used to encrypt a time based client identification number before embedding it in the virtual account number.

13. The method of claim 12, further comprising:
calculating a check digit from the time based client identification number, wherein the check digit value is used to determine a scheme for distributing the encrypted time based client identification number and a part of MOTP in the virtual account number.

14. The method of claim 12, wherein the time based client identification number is of 6 to 8 digits in the virtual account number.

15. The method of claim 9, further comprising:
scanning to read the bar code or enter the TAN generated at the client device by a third party entity;
transmitting the scanned bar code or TAN to the server; and
validating the TAN by the server triggers the confirmation of the transactions result.

16. The method of claim 15, wherein the step of scanning includes receiving TAN through wire or wireless communication means, and wherein the wireless communication means includes near field communication.

17. The method of claim 15, wherein the client device and the third party entity receives an instant confirmation about the result of the transaction, wherein the instant confirmation could be via SMS, Email, from the same communication network or any other real time confirmation to the user.

18. The method of claim 17, wherein the real time confirmation message includes a part of a user's personal sign message in order to verify the authenticity of an end-user.

19. The method of claim 17, wherein the client device is a user and the third party entity is a merchant, wherein the merchant can be another user.

20. The method of claim 9, wherein the barcode is a 1D or 2D barcode including EZ code, a data matrix code and a QR code.

* * * * *